US011170215B1

(12) United States Patent
Sieracki

(10) Patent No.: US 11,170,215 B1
(45) Date of Patent: Nov. 9, 2021

(54) SYSTEM AND METHOD FOR DISCRIMINATING AND DEMARCATING TARGETS OF INTEREST IN A PHYSICAL SCENE

(71) Applicant: REALITY ANALYTICS, INC., Columbia, MD (US)

(72) Inventor: Jeffrey Mark Sieracki, Clarksville, MD (US)

(73) Assignee: REALITY ANALYTICS, INC., Columbia, MD (US)

( * ) Notice: Subject to any disclaimer, the term of this patent is extended or adjusted under 35 U.S.C. 154(b) by 465 days.

(21) Appl. No.: 15/582,389

(22) Filed: Apr. 28, 2017

Related U.S. Application Data

(60) Provisional application No. 62/329,100, filed on Apr. 28, 2016.

(51) Int. Cl.
*G06K 9/00* (2006.01)
*G06T 11/60* (2006.01)
(Continued)

(52) U.S. Cl.
CPC ....... *G06K 9/0063* (2013.01); *G06K 9/00624* (2013.01); *G06K 9/4604* (2013.01);
(Continued)

(58) Field of Classification Search
CPC ............ G06K 9/00624; G06K 9/0063; G06K 9/00637; G06K 9/00651; G06K 9/00657; G06K 9/46; G06K 9/4604; G06K 9/48; G06K 9/481; G06K 9/482; G06K 9/62; G06K 9/6217; G06K 9/6218; G06K 9/6219; G06K 9/6232; G06K 9/6234; G06K 9/6267; G06K 9/6269; G06K 9/627; G06K 9/6285; G06K 9/6287; G06K 9/6288; G06K 9/6292; G06K 9/6293; G06K 9/6298; G06K 9/66; G06K 2009/00664; G06K 2009/6295; G06K 2209/17; G06K 2209/21; G06K 9/00; G06T 7/10; G06T 7/40; G06T 7/70; G06T 7/90; G06T 11/60; G06T 2207/10004; G06T 2207/10024;
(Continued)

(56) References Cited

U.S. PATENT DOCUMENTS 6,549,660 B1 * 4/2003 Lipson ................. G06K 9/6255
382/224
8,363,933 B2 * 1/2013 Yasuda ................ G06K 9/4642
382/164
(Continued)

*Primary Examiner* — Eric Rush
(74) *Attorney, Agent, or Firm* — Rosenberg, Klein & Lee

(57) ABSTRACT

Captured samples of a physical structure or other scene are mapped to a predetermined multi-dimensional coordinate space, and spatially-adjacent samples are organized into array cells representing subspaces thereof. Each cell is classified according to predetermined target-identifying criteria for the samples of the cell. A cluster of spatially-contiguous cells of common classification, peripherally bounded by cells of different classification, is constructed, and a boundary demarcation is defined from the peripheral contour of the cluster. The boundary demarcation is overlaid upon a visual display of the physical scene, thereby visually demarcating the boundaries of a detected target of interest.

7 Claims, 20 Drawing Sheets
(10 of 20 Drawing Sheet(s) Filed in Color)

(51) Int. Cl.
*G06K 9/66* (2006.01)
*G06K 9/62* (2006.01)
*G06K 9/48* (2006.01)
*G06T 7/90* (2017.01)
*G06K 9/46* (2006.01)

(52) U.S. Cl.
CPC ........... *G06K 9/481* (2013.01); *G06K 9/6217* (2013.01); *G06K 9/6219* (2013.01); *G06K 9/6232* (2013.01); *G06K 9/6269* (2013.01); *G06K 9/6287* (2013.01); *G06K 9/6292* (2013.01); *G06K 9/66* (2013.01); *G06T 7/90* (2017.01); *G06T 11/60* (2013.01); *G06K 2009/6295* (2013.01); *G06K 2209/21* (2013.01); *G06T 2207/10024* (2013.01); *G06T 2207/10028* (2013.01); *G06T 2207/10032* (2013.01); *G06T 2207/20016* (2013.01); *G06T 2207/20021* (2013.01); *G06T 2207/20221* (2013.01); *G06T 2207/30181* (2013.01); *G06T 2207/30212* (2013.01)

(58) Field of Classification Search
CPC . G06T 2207/10028; G06T 2207/10032; G06T 2207/10036; G06T 2207/20016; G06T 2207/20021; G06T 2207/20048; G06T 2207/20056; G06T 2207/20081; G06T 2207/20084; G06T 2207/20221; G06T 2207/30181; G06T 2207/30184; G06T 2207/30188; G06T 2207/30212
USPC ....... 382/100, 103, 108, 109, 155, 156, 159, 382/160, 164, 165, 170, 171, 173, 181, 382/190, 191, 199, 201, 205, 216, 382/224–228, 256, 276, 277, 280–282, 382/285, 291, 293, 294, 298–300; 348/135–137, 143–147, 169–172
See application file for complete search history.

(56) References Cited

U.S. PATENT DOCUMENTS

| | | | |
|---|---|---|---|
| 8,401,292 B2 | 3/2013 | Park et al. | |
| 8,483,425 B2 | 7/2013 | Guo et al. | |
| 8,503,761 B2 | 8/2013 | Akbari et al. | |
| 8,665,266 B2 | 3/2014 | Vandrovec | |
| 8,666,114 B2 | 3/2014 | Schloegel et al. | |
| 8,687,892 B2* | 4/2014 | Demoulin | G06K 9/4671 382/192 |
| 8,768,048 B1 | 7/2014 | Kwatra et al. | |
| 8,873,812 B2* | 10/2014 | Larlus-Larrondo | G06K 9/00 382/118 |
| 8,983,141 B2 | 3/2015 | Kumaran | |
| 9,477,901 B2 | 10/2016 | Paiton et al. | |
| 9,535,927 B2 | 1/2017 | Bursey | |
| 9,600,765 B1 | 3/2017 | Pedersen et al. | |
| 9,785,828 B2* | 10/2017 | Ayvaci | G06K 9/4642 |
| 2002/0122596 A1* | 9/2002 | Bradshaw | G06K 9/685 382/226 |
| 2006/0133699 A1* | 6/2006 | Widrow | G06K 9/62 382/305 |
| 2007/0003138 A1 | 1/2007 | Hobson et al. | |
| 2008/0310717 A1* | 12/2008 | Saathoff | G06K 9/342 382/173 |
| 2009/0316988 A1* | 12/2009 | Xu | G06K 9/6857 382/173 |
| 2010/0027845 A1* | 2/2010 | Kim | G06K 9/00355 382/107 |
| 2010/0027892 A1* | 2/2010 | Guan | G06K 9/00355 382/203 |
| 2010/0040285 A1* | 2/2010 | Csurka | G06K 9/00624 382/170 |
| 2010/0211794 A1* | 8/2010 | Bilobrov | G06K 9/00067 713/176 |
| 2010/0283662 A1* | 11/2010 | Fox | G01S 7/2922 342/53 |
| 2011/0052063 A1* | 3/2011 | McAuley | G06K 9/527 382/180 |
| 2011/0255741 A1* | 10/2011 | Jung | G06K 9/00369 382/103 |
| 2012/0219211 A1* | 8/2012 | Ding | G06K 9/4642 382/159 |
| 2015/0254738 A1 | 9/2015 | Wright, III et al. | |
| 2015/0371115 A1* | 12/2015 | Marchisio | G06K 9/0063 382/159 |
| 2016/0063727 A1* | 3/2016 | Gao | G06K 9/00335 382/103 |
| 2017/0053169 A1 | 2/2017 | Cuban et al. | |

* cited by examiner

SYSTEM AND METHOD FOR DISCRIMINATING AND DEMARCATING TARGETS OF INTEREST IN A PHYSICAL SCENE

RELATED PATENTS AND APPLICATIONS

This application is based on U.S. Provisional Patent Application No. 62/329,100, filed on Apr. 28, 2016, the contents of which are incorporated herein by reference.

BACKGROUND OF THE INVENTION

Computer-based classification and identification is a rapidly growing field, due to the development of machine learning. Classifiers, such as support vector machines (SVMs), may be "trained" using data representations of objects, sounds, signals, biometrics, and other real-world features and conditions to remember and recognize the same, and even to classify novel features and conditions as in the same category due to shared characteristics. With sufficient processing power and training data, the potential in this field appears unlimited, with classifiers able to recognize a particular feature or category of feature even in enormous datasets.

However, because neither processing power nor training data is infinite, it is desirable to organize a dataset for presentation to a classifier, such that it may isolate the identifying characteristics more efficiently. Particular classifications from particular data sets—for example, classifying objects or surface features within a spatial dataset—may have different organization needs, and ideal methods of organization are still being developed.

Additionally, classifiers do not, by themselves, accurately define the spatial boundaries of the object being classified. This is a particular problem when the object being classified is a distributed aspect of the target environment and has weakly defined boundaries, such as a region of texture in a natural environment or geospatial terrain model, an irregular process such a corrosion on a metal surface, or other spatially dispersed aspect of an unconstrained environment. Precise determination of these boundaries would be useful in clearly presenting the results of the classification process.

SUMMARY OF THE INVENTION

While not limited thereto, an exemplary embodiment of the invention is directed to a system for detecting and visually demarcating a target of interest represented within a physical scene. The system includes at least one sample capture device capturing samples of a physical scene. The system further includes an array generating portion executing on a processor to construct a multi-dimensional spatial array of cells defined according to a predetermined multi-dimensional coordinate space. Each cell contains a plurality of spatially-adjacent captured samples respectively mapped to corresponding coordinates within the multi-dimensional space, and thereby spans a subspace within the predetermined multi-dimensional coordinate space. The system further includes a target discriminating portion executing on a processor to classify at least one cell according to predetermined target-identifying criteria for the samples of the cell, and to construct at least one cluster of spatially-contiguous cells of common classification. Each cluster is peripherally bounded in the predetermined multi-dimensional coordinate space by cells of different classification. The system further includes a user interface portion configured to generate a composite image having at least one boundary demarcation overlaying a visual display of the physical scene. Each boundary demarcation is defined with respect to the predetermined multi-dimensional coordinate space according to a peripheral contour of one cluster and is overlaid upon corresponding coordinates of the multi-dimensional coordinate space of the visual display.

While not limited thereto, another exemplary embodiment of the invention is directed to a method for detecting and visually demarcating a target of interest represented within a physical scene. The method includes capturing a plurality of samples of a physical scene. The method further includes mapping each of the plurality of captured samples to corresponding coordinates within a predetermined multi-dimensional coordinate space. The method further includes constructing a multi-dimensional spatial array of cells defined to span spanning a subspace within the predetermined multi-dimensional coordinate space, each cell containing a plurality of spatially-adjacent captured samples within the subspace. The method further includes classifying at least one cell according to predetermined target-identifying criteria for the samples of the cell. The method further includes constructing at least one cluster of spatially-contiguous cells of common classification, each cluster being peripherally bounded in the predetermined multi-dimensional coordinate space by cells of different classification. The method further includes generating a composite image having at least one boundary demarcation overlaying a visual display of the physical scene, each boundary demarcation being defined with respect to the predetermined multi-dimensional coordinate space according to a peripheral contour of one cluster and being overlaid upon corresponding coordinates of the multi-dimensional coordinate space of the visual display.

While not limited thereto, yet another exemplary embodiment of the invention is directed to a system for detecting and visually demarcating a surface feature of interest represented on a surface of a physical structure. The system includes at least one sample capture device capturing samples of a surface of a physical structure. The system further includes an array generating portion executing on a processor to construct a multi-dimensional spatial array of cells defined according to a predetermined multi-dimensional coordinate space. Each cell contains a plurality of spatially-adjacent captured samples respectively mapped to corresponding coordinates within the multi-dimensional space, and thereby spans a subspace within the predetermined multi-dimensional coordinate space. The system further includes a target discriminating portion executing on a processor to classify at least one cell according to predetermined target-identifying criteria for the samples of the cell, and to construct at least one cluster of spatially-contiguous cells of common classification. Each cluster is peripherally bounded in the predetermined multi-dimensional coordinate space by cells of different classification. The system further includes a user interface portion configured to generate a composite image having at least one boundary demarcation overlaying a visual display of the physical structure. Each boundary demarcation is defined with respect to the predetermined multi-dimensional coordinate space according to a peripheral contour of one cluster, and is overlaid upon corresponding coordinates of the multi-dimensional coordinate space of the visual display.

Additional aspects, details, and advantages of the disclosed system and method will be set forth, in part, in the description and figures which follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1A:
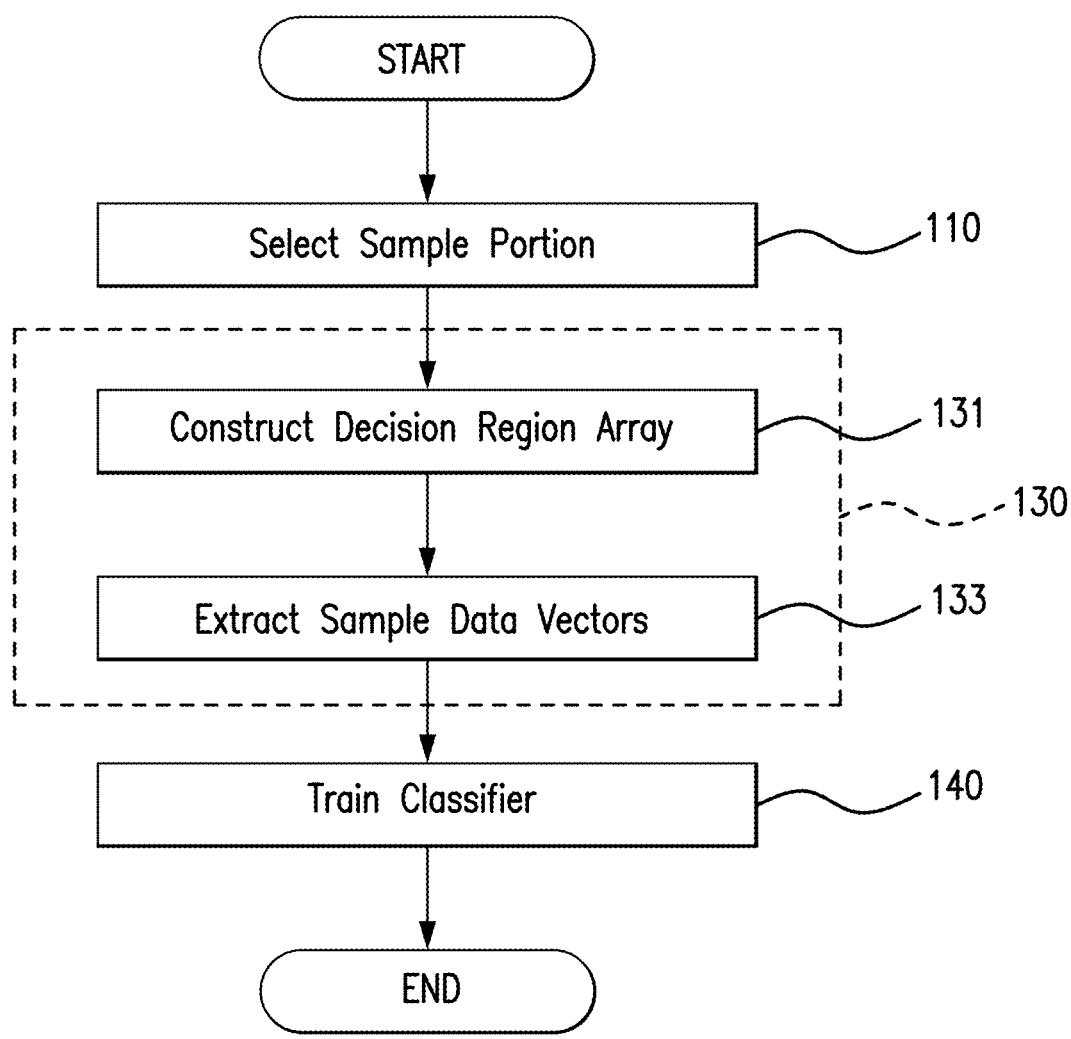
FIG. 1A is a block flowchart illustrating a method for training a classifier to recognize a feature in a spatial dataset, in accordance with an exemplary embodiment of the present invention.

Reference will now be made in detail to exemplary embodiments, which are illustrated in the accompanying drawings, wherein like reference numerals refer to the like elements throughout. The embodiments are described below in order to explain the disclosed system and method by referring to the figures.

Section headings are included in this Detailed Description. It is noted that these section headings are for convenience only and should not be interpreted as limiting the scope of the claimed invention in any way.

1. General Principles

The present invention is directed to the field of signal and image processing and feature detection and demarcation, and is applicable to various applications, including various inspection and survey applications. In certain applications, it is directed toward the inspection of data sets gathered from systems such as aerial imaging, UAV drones, satellites, and terrestrial cameras, imaging and scanning devices and survey and inspection tools. In certain applications, it is directed toward recovery of information from assemblies of such data, including single and multi-modality data sets, and aggregate data representations such as orthophotos, terrain and structure point cloud (from LIDAR or photogrammetric measurements), and collections of multi view point inspection photos. In still other applications, it is also directed toward the generation of overlays of such data with additional spatially raster imaging and or sensor measurements such as multiband and hyper-spectral data, FIR thermal imagery, terahertz imaging, etc., as well as to derived spatial metrics including ratios of energy in different bands such as those used to judge plant health or ground cover composition or to adjust for reflective lighting variations.

In general, these data sources are spatially (or geospatially) referenced, so that each data point has a known (or approximately known) location relative to its neighbors or to an absolute datum, within a physical space or on the surface of a physical structure. For example, terrain imagery may be mapped pixel by pixel to its geospatial location, while inspection imagery about a structure may be mapped to its location within the image or, using key points to tie images together, to actual points on the 3D structure. By maintaining the context of coordinates in a physical space throughout the classification process, a demarcation of the size and shape of a target of interest is simplified, as will be shown.

Data may be in a raster format such as images, or other spatial matrices of data, or may be vectorized, or may comprise sparse point clouds of 3D information (such as terrain elevations or structural LIDAR scans).

Commercial use of drones, and availability of terrestrial automated inspection imagery, has driven generation and proliferation of such data sets. The most common instrumentation is a camera, sometimes including infra-red (IR) or multi-spectral imaging sensors. From collations of still or video images in these sensing modalities, these numerous tools of art are now available to create mosaics, orthophotos, point-of-view adjustable inspection sequences, and via photogrammetric, 3D point cloud, or digital elevation renderings of the surfaces and structures within them. Less common commercially, but still prevalent, are tools such as LIDAR which reflect laser light from points to directly create point cloud or digital elevation or structural models.

The information to be gathered from such data aggregations may include such physical properties as the outline of features, object, or discontinuities, berms, ditches stockpiles, and so forth. It may also include texture and color details, which in turn may be used to identify with some confidence the nature of a surface or the type of material at a particular location.

Examples of physical property detection and discrimination include but are not limited to discriminating vegetation cover from bare dirt area, or in more detail, discriminating the type or health of vegetation or the type of open dirt area. Areas of loose earth, packed earth, rocks and scree, gravel, asphalt, sand, tillage, swamp, tussocks, fallen trees and sticks, etc. can all impact commercial interests in planning and monitoring operations as well as military and civil interests in estimating how easily an area can be traversed by foot or vehicle.

Inspection use cases include but are not limited to examining metal trusses, towers, bridges, etc. for rust or paint damage; examining roofing or building materials for damage or improper-installations; examining fields for crop growth or wind damage, etc.

In addition to identifying standard physical targets of these and other type, a feature of embodiments of the present invention is that users can train a classifier by example to recognize their particular targets of interests—whether materials, surface quality, texture, etc.

An additional aspect of the invention is to make the management and use of these tools intuitive and straight forward in graphic user interaction settings.

For the purposes of the description, the following terms will be used:

A dataset refers to any set of data points captured as samples from a physical space or physical scene in the real world. The sampled data points thereby represent, in some manner, the source scene.

In a spatial or geospatial dataset, each sampled data point is associated with and mapped to spatial or geospatial coordinates in a three-dimensional (or other multi-dimensional) space, in accordance with the real world source. These coordinates may simply be relative to the others in the space, or based on some other reference point.

For brevity, the term "spatial" shall include "geospatial" hereinafter, save where the distinction is noted to be relevant.

The sampled data points in a dataset may be of one data type (that is, format) or of a plurality of data types, and may have been sampled using one or a plurality of modalities (e.g. video, audio, etc.). The two frequently correspond one-to-one, as different sampling modalities may be expected to produce different forms of samples, but separate data formats may also be desirable even when using the same modality, to capture distinct types of samples, and it may also be possible to store samples of different modalities in the same format. For convenience and brevity, a one-to-one correspondence will be assumed hereinafter, but those of skill will be able to expand the disclosures to include non-correspondence between the two.

When multiple data types are employed, the dataset may also be organized as a plurality of datasets, each representing a subset of the data types. For example, a dataset may contain data points of color (in, e.g., RGB format), texture (in, e.g., surface point cloud format), and heat (in, e.g., temperature value format); this dataset may be reorganized as three datasets each containing data points of only one of the three datatypes, or as two datasets where the first dataset contains both the color and texture data points and the second dataset contains the heat data points, among other arrangements.

It is noted that a dataset may also contain data points of a single data type, but captured at multiple resolutions (e.g. at both one data point per centimeter and at one data point per millimeter), or in multiple dimensional spaces (e.g. both in two dimensions and in three dimensions). The dataset may also be organized as a plurality of datasets, each representing a single resolution or dimension space. Combinations of multiple data types, resolutions, and dimension spaces are also possible.

A region, or portion, of a spatial dataset refers to a subset of the data points, where the coordinates of all data points in the region are contained within a bounded subset of the larger space.

A feature may be anything within the real world which is represented in a dataset. Features may be classified—that is, identified according to a category, using the data points in a dataset which represent said feature—by embodiments of the invention which are described herein. When an embodiment of the invention is configured to identify, classify, and/or demarcate a particular category of feature, such features may be termed targets of interest, or simply targets.

A feature may be essentially two-dimensional and exist on a larger two-dimensional surface, in which case it may be termed a "surface feature." Examples of surface features include, but are not limited to, rust on a metal structure, paint or other covering on a wall, damage to a structure, or materials from which something is constructed. As nothing in the real world is truly two-dimensional, this term is relative to the breadth of the surface and of the feature as measured over two dimensions. Therefore, for example, trees, grass, crops, or other vegetation covering a large section of ground may be treated as "essentially two-dimensional" relative to the surface of the ground, and therefore a surface feature of the ground, for the purposes of embodiments specific to surface features. Additionally, any three-dimensional (or other multi-dimensional) spatial dataset may be reduced to two dimensions, making all features within equivalent to surface features for the purposes of embodiments specific to surface features.

A feature may also be three-dimensional, and in such cases may also be termed an "object." Examples of objects include but are not limited to terrain features (such as mountains, hills, and artificially-created mounds), vehicles, stockpiles, and structures, as well as discontinuities in any of the above. It is noted that the scope of the invention may also include features existing in multi-dimensional spaces other than two- and three-dimensional spaces, to the extent that samples of these features may be captured.

A classifier is a set of rules and/or algorithms, executing on a computer processor or other microprocessor-based device or platform, which define how to process data values from samples of a dataset in order to identify the feature represented by said data. A classifier may be "trained" by processing data which is known to represent a particular category of feature and storing the results; these results serve as identifying criteria, and the classifier's rules and algorithms may compare the data of newly processed samples representing an unknown feature with these criteria to determine if the feature is of the same category. In some but not all embodiments, a classifier is trained to identify a specific category of feature and classify an unknown feature as in or out of said category; this category represents the classifier's target of interest.

FIG. 1A is a flowchart depicting a method for training a classifier to recognize a feature in a spatial dataset, according to an exemplary embodiment of the invention.

At 110, a sample portion of a space or on a surface in the spatial dataset is selected for training, where said portion is associated with a known classification. A user may be permitted to define the features which the classifier will be trained to identify, by defining one or more example regions which are known to contain such features. The example region may be selected, for instance, according to a bounding box process, which will be described further herein.

At 130, data vectors are extracted from the example region. This may be accomplished, for instance, according to an array generation process, wherein an array of cells, representing a plurality of decision regions tiled across the example region, is constructed at 131, and data vectors corresponding to samples within each decision region are extracted at 133. The array generation process will be described further herein.

At 140, the data vectors are used as examples of the known classification in the training of the classifier. The training process will be described further herein.

Figure 1B:
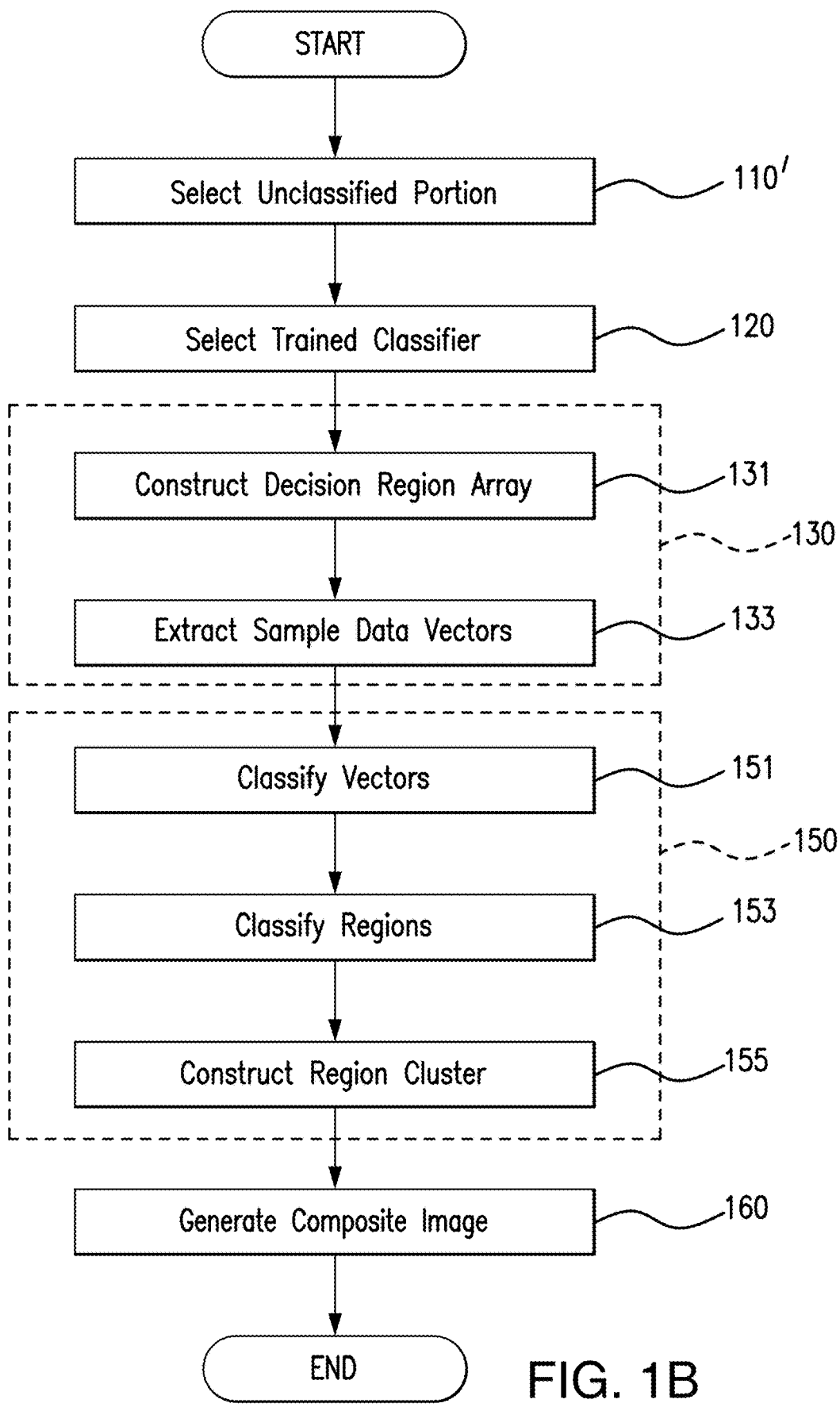
FIG. 1B is a block flowchart illustrating a method for classifying a feature in a spatial dataset, in accordance with an exemplary embodiment of the present invention.

FIG. 1B is a flowchart depicting a method for classifying and demarcating a feature in a spatial dataset of samples from a physical scene, according to an exemplary embodiment of the invention.

At 110', an unclassified portion of a space or on a surface of the physical scene which is represented by the samples in the spatial dataset is selected. The portion may be selected, for instance, according to a bounding box process, which will be described further herein.

At 120, a classifier trained under the method depicted in FIG. 1A is selected. In some embodiments, multiple classifiers may be selected, either individually or because said classifiers are associated.

At 130, data vectors are extracted from the unclassified portion. This may be accomplished, for instance, according to an array generation process, wherein an array of cells, representing a plurality of decision regions tiled across the example region, is constructed at 131, and data vectors corresponding to samples within each decision region are extracted at 133. The decision region process will be described further herein. In any event, the extraction operation 131 here should be consistent with the extraction operation 131 used in the training of the classifier.

At 150, the unclassified portion is classified. This may be accomplished, for instance, according to a target discrimination process, wherein extracted data vectors are individually classified by the selected classifier at 151, the results of these vector classifications are aggregated to classify each decision region at 153, and the decision region results, for the entire unclassified portion or some subset thereof, are aggregated to construct a cluster of said regions at 155. The classification and aggregation processes will be described further herein.

Each cluster of decision regions is a representation of the boundaries of a feature. However, this representation is not in a format helpful to people. Therefore, at 160, a visual display of the physical scene from which the spatial dataset was sampled is combined with an overlay which accurately demarcates the boundaries of the classified target feature, generating a composite image. The boundaries of the overlay may be defined according to the portion selected in 110', a cluster of decision regions which have been constructed in 155, or some combination thereof. The resulting composite image clearly demarcates the boundaries of the target of interest against the visual display.

Figure 2:
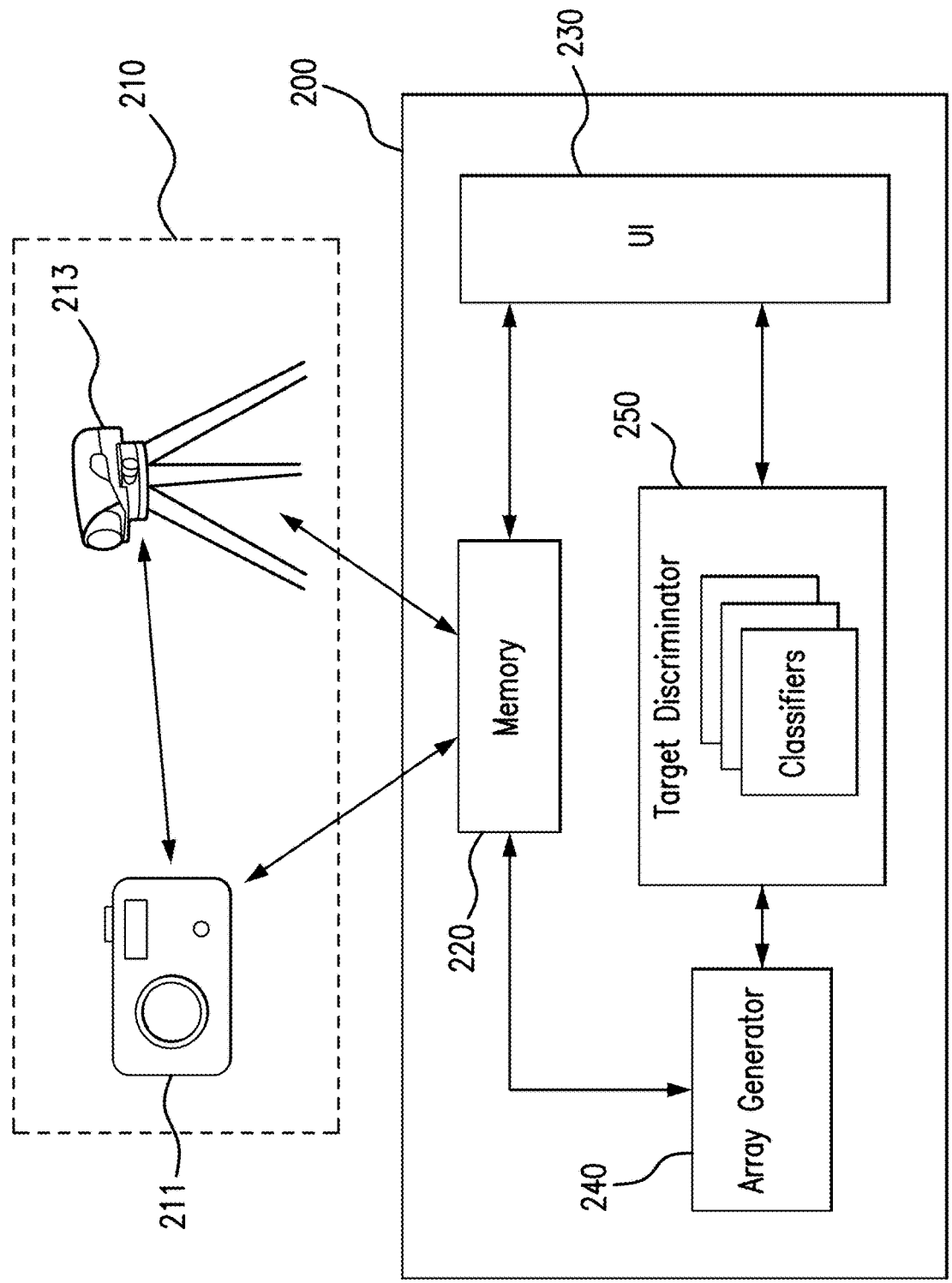
FIG. 2 is a block diagram illustrating a system for classifying features in a spatial dataset, in accordance with an exemplary embodiment of the present invention.

FIG. 2 is a block diagram depicting a system 200 for classifying and demarcating features within a physical scene, according to an exemplary embodiment of the invention.

One or more sample capture devices 210 are configured to capture samples from a real world physical scene source. The sample capture devices 210 may include an image capture device 211, which captures one or more images from the source; each image, or pixel or set of pixels within, may represent a sample. An image capture device 211 may be, for example, a digital camera. The sample capture devices 210 may also include a spatial capture device 213, which captures physical location or spatial data from the source. A spatial capture device 213 may be, for example, a LIDAR scanner, or a photogrammetric array (which may include the image capture device 211). It is noted that the handheld and tripod depictions of the sample capture devices 210 in FIG. 2 are not intended as a limitation, as actual devices may take numerous forms and be mounted in any manner, including on vehicles, robotic mounts, or drones or other aerial platforms. Other possible sample capture devices 210 are not depicted, but may include heat/infrared sensors or terahertz imagers. It is noted that the individual sample capture devices 210 may be physically separated from each other, and from the other components of the system 200. However, preferably, the sample capture devices 210 are linked and configured to capture the same physical space, producing associated datasets which represent said physical scene in different ways.

The spatial capture device 213, if included, preferably also captures spatial coordinates in the predetermined multi-dimensional coordinate space of the physical scene. These coordinates may then be mapped to the samples. In some embodiments, the spatial capture device 213 captures spatial coordinates for this mapping to the exclusion of other forms of samples. If a spatial capture device 213 is not included, spatial coordinates for the samples of the other sample capture devices 210 may be collected in other ways, such as determined by the placement of the sample collection points relative to each other.

The samples may be organized into datasets and are provided to a memory 220, which stores them and other information, such as software instructions, for processing.

A user interface 230, which may be implemented at least in part by suitable software executed on a processor, enables user selection of one or more portions of the captured dataset or datasets. One or more portions of the captured datasets may also be selected according to automated methods. Preferably, if datasets are associated, corresponding portions of each of the datasets are selected at once. If the datasets are spatial datasets, this association is preferably based on shared spatial coordinates in said data; that is, the same subset of spatial coordinates is selected in each dataset. The selection, and corresponding portion, may be refined to better fit a feature represented in the datasets, in a manner to be described further herein.

The UI 230 may also overlay a defined region, such as the selection above, onto a visual representation or display of the physical scene. The visual representation may be a true image captured by the image capture device 211, or a visual extrapolation of another dataset captured by any of the capture devices 210. Both the visual display and the defined region are associated with a two-dimensional (or multi-dimensional) coordinate space, defined relative to each other, and preferably also relative to the physical scene. Therefore, coordinates from one may correspond to coordinates from the other, and the coordinates of the defined region may be overlaid, with appropriate spatial mappings, upon corresponding coordinates in the visual display.

An array generating portion 240, which may be software executed on a processor, constructs a multi-dimensional spatial array of cells which divides the samples of the selected portion of the datasets into a plurality of decision regions, in a manner to be described further herein.

A target discriminating portion 250, which may be software executed on a processor, is configured to compare data vectors extracted from the decision regions with pre-classified data vectors, or other predetermined target-identifying criteria, in a previously established training set. The pre-classified data vectors each represent and are each associated with a feature classification. The target discriminating portion 250 produces one or more vector classification scores or votes based on the comparisons, which define a measure of the likelihood of the vector representing the same feature as a pre-classified data vector. The target discriminating portion 250 may include one or more individual classifiers, including but not limited to support vector machines (SVMs), for this comparison.

The target discriminating portion 250 may also directly extract the data vectors from the decision regions. In certain embodiments, the extraction may be performed by a separate extraction portion, which may be software executed on a processor.

The target discriminating portion 250 may also aggregate the vector classification scores for the vectors of a decision region in order to determine the classification, or a classification score, for the region and corresponding array cell, in a manner to be described further herein. The target discriminating portion 250 may also construct clusters of spatially-adjacent cells of common classification, in order to define the boundaries of a target feature having said classification, in a manner to be described further herein. In certain embodiments, these operations are performed by one or more separate portions of the system, which may be software executed on a processor. The cluster may be provided to the UI 230 for use as a defined region to overlay upon the visual display.

Certain embodiments may include a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) may also be developed to perform these functions.

In preferred embodiments, spatial coordinates of the pre-determined multi-dimensional coordinate space of the physical scene are mapped to the captured samples, and this mapping is maintained throughout the processes that follow. The decision regions, and corresponding cells of the array, are constructed to each contain spatially-adjacent samples representing a subspace of the coordinate space, and the constructed clusters are of spatially-adjacent cells of common classification, peripherally bounded in the coordinate space by cells of different classification. Additionally, the coordinate space of the visual display is defined relative to the coordinate space of the physical scene, and therefore coordinates of one map to those of the other. Because of the consistency of the spatial mapping of the samples, cells, and cell cluster to the predefined coordinate space of the physical scene, if the classifications of the individual cells are accurate, the cluster overlay will accurately represent the boundaries of the classified target against the visual display, even when the target is distributed or dispersed in the physical scene.

It is noted that, while the correspondence between each dataset must be consistent relative to one another with respect to the physical scene, there is no strict requirement of an absolute measure in the physical space. Thus, for example, an image might be used in an inspection use where the relationships among decision regions and pixels are maintained consistently, relative to an arbitrary fixed datum, but with the exact physical size of the image in, for example, cm never determined.

2. The Bounding Box

For each dataset considered, a polygonal bounding box may first be defined within the spatial mapping for each of one or more features to be classified, to select a portion of the data for consideration, as briefly described for operation 110 of FIG. 1A and operation 110' of FIG. 1B. Example bounding boxes are depicted in FIG. 3B, where each of multiple polygonal bounding boxes 320 follows the contours of mounds in a terrain space. This bounding box may be identified manually or through an automated process, using means known in the art. The boundaries of the portion are preferably defined relative to the predetermined coordinate space of the physical scene; that is, defined to contain the samples mapped within a subspace of the coordinate space.

It is noted that, for simplicity, the bounding box is two-dimensional, and it is assumed that the region selected by the bounding box is not bounded in the third dimension (i.e. vertically) in this example. However, in various embodiments, the bounding box may bound a portion of the data in all, or any subset of, the dimensions of the represented space.

The bounding box may be expanded, reduced, or otherwise refined from an initial selection to more precisely fit the feature being considered. In embodiments which implement said refinement, the initial selection may be deliberately imprecise. For example, in FIG. 3A, simple rectangular bounding boxes 310 are depicted. A refinement process then more precisely defines the features in question, altering the simple rectangular bounding boxes 310 to become the refined bounding boxes 320 depicted in FIG. 3B.

However, it is noted that an unrefined bounding box may suffice so long as it does not excessively extend beyond the feature to be classified, and the refinement process may be ignored for reasons of efficiency.

More examples of bounding box determinations will be described and depicted further herein.

Figure 4:
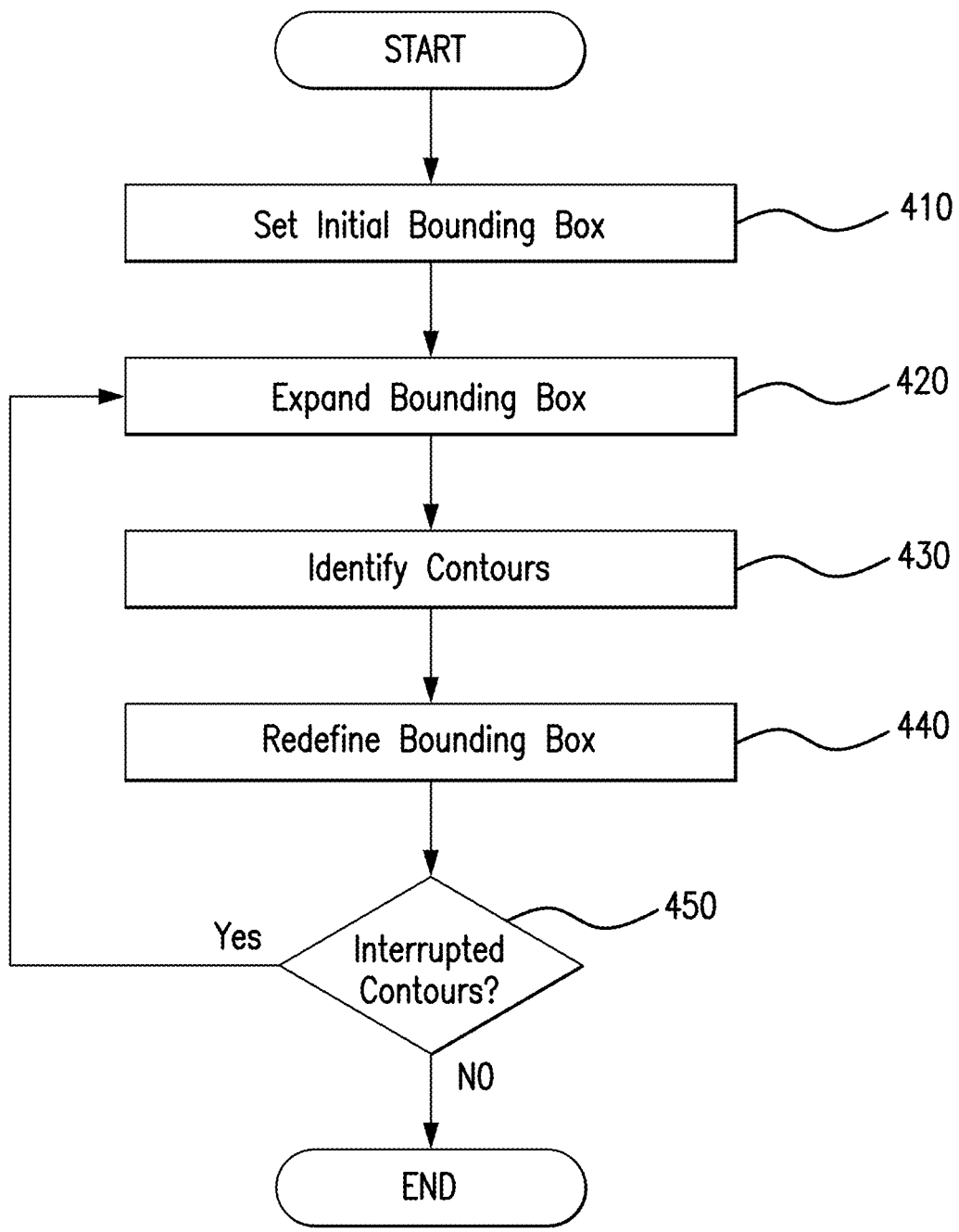
FIG. 4 is a block flowchart illustrating a method for refining a boundary of a feature, in accordance with an exemplary embodiment of the present invention.

FIG. 4 is a flowchart depicting a method for refining a boundary of a feature, according to an exemplary embodiment of the invention.

At 410, an initial bounding box in the form of a polygon contour is set to demark the boundary of a feature. As noted above, the initial bounding box may take a very simple form, such as a rectangle. However, the initial bounding box should preferably contain at least the major central portion of the target feature, as this will accelerate the remainder of the process.

At 420, the box is expanded by a predetermined amount or ratio. A preferable expansion value for this operation will vary based on the specific dataset and the features intended to be analyzed, and may in some embodiments be set manually by a user.

At 430, contours are identified within the box. Methods of identifying contours in spatial or other datasets are known in the art, but may include, without limitation, the following operations:

- Taking paths along constant elevation or constant slope in a three-dimensional spatial dataset. A slope may be estimated by taking a numerical first derivative of elevation data, or by other methods.
- Taking paths along lines of intersection between the feature and a pre-established plane in a three-dimensional spatial dataset. This pre-established plane may be level with a physically existing surface (such as the ground, a roof, or a wall), or with a specific elevation (such as sea level), or it may be established according to some other arbitrary or non-arbitrary reference. The pre-established plane may be formed from a collection of points, which may be defined about the feature, or by break points in slope within the (expanded) bounding box.
- Edge detection in a two-dimensional dataset.

In some embodiments, contours above or below a certain size or elevation, or which are contained within larger contours, are not considered at 430.

At 440, the boundaries of the bounding box are redefined according to the identified contours.

Preferably, the expansion in 420 is large enough that only one iteration is necessary. However, optionally, this is confirmed at 450, where it is determined if any contours extend beyond the boundaries of the box or are interrupted by the box boundaries. If so, the process returns to 420 to expand the box again. (In some embodiments, the box is only expanded at said interruptions.) If not, the bounding box is determined to be completely refined, and the process completes.

The refined bounding box may be employed to define features or structures within a spatial dataset, which in turn may be employed to assist in classifying said features and structures according to material, surface type, texture, or other aspects, or in providing said features and structures as examples for classification training. Other uses for a refined bounding box may also be imagined by those of skill in the art.

For some data sets, it may not be practical or possible to designate a bounding box for a particular feature at all. In such cases, the bounding box may be set to blindly encompass a region without awareness of how many individual features are present within said region, or the entire dataset may even be treated as within the bounding box. The boundaries of specific features are then identified after the classification process, in a manner to be described further herein.

3. Decision Regions and Data Vectors

Figure 5A:
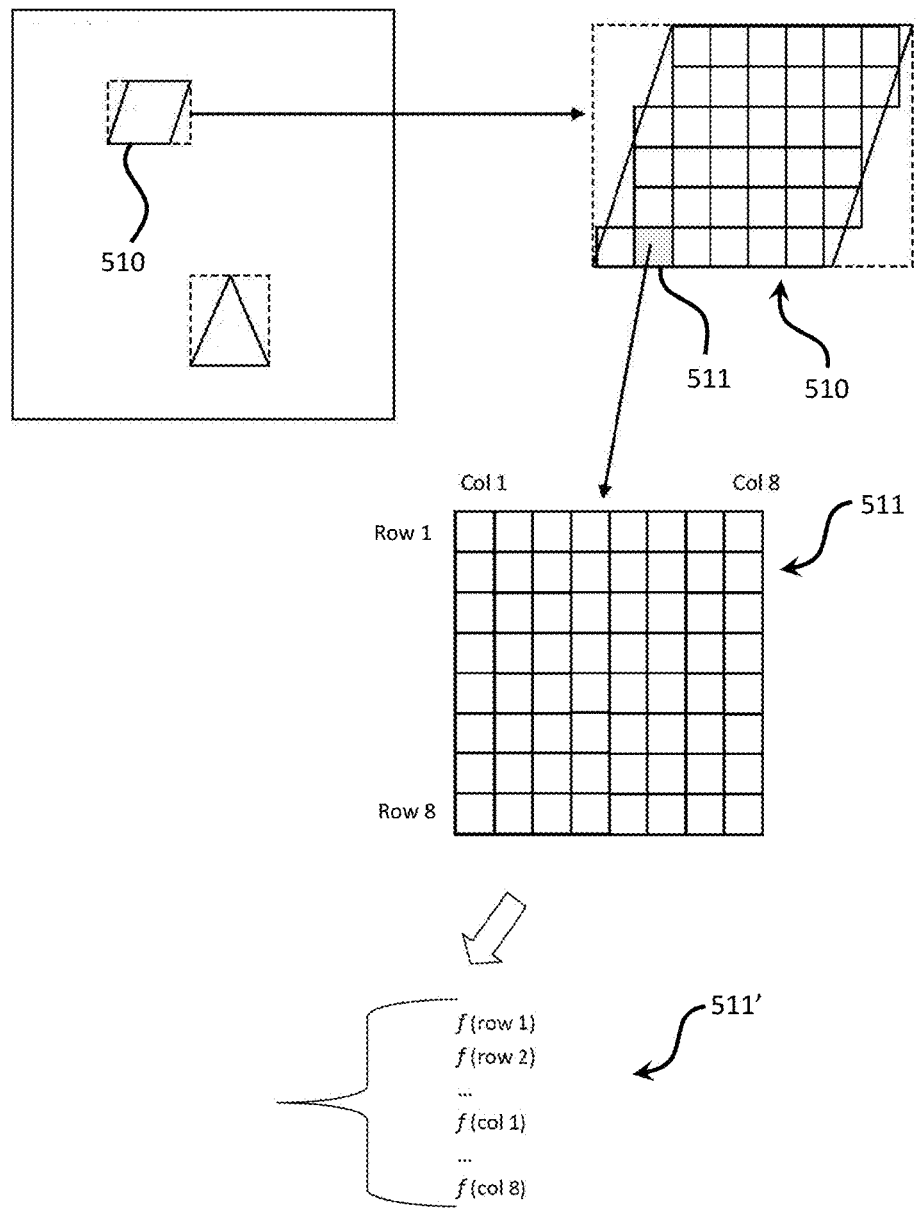
FIG. 5A is a flowchart illustrating conversion of an example selection to decision regions, and a decision region to data vectors, in accordance with an exemplary embodiment of the present invention.

Whether or not first refined, the bounding box is tiled, within the interior of the polygon, with decision regions, and an array of corresponding cells is constructed, as briefly described for operation 131 of FIGS. 1A and 1B. FIG. 5A depicts, as an example, a geometric breakdown of a simple parallelogram bounding box 510 into a plurality of equally-sized decision regions such as 511. Each decision region is defined relative to predetermined coordinate space of the physical scene; that is, defined to contain the samples mapped within a subspace of the coordinate space (which is smaller than the subspace defined by the bounding box). It will be apparent that similar tiling may be applied to a bounding box of any complexity. It will also be apparent that this tiling may alternatively be applied to the entire dataset, removing the need to define a bounding box at all, although at the time and processing expense of processing every sample in the dataset.

Decision regions may be of any shape relative to the coordinate space, and of any size from one sample (e.g. pixel) up; they may also overlap. The example decision regions 511 are square and non-overlapping for clarity of depiction, but other embodiments might use, for example, rectangular, round, hexagonal, or other decision regions, and might define these decision regions to overlap by one or more samples for a much higher spatial resolution class on decisions. Likewise, the size of the decision regions may vary, and is preferably determined based on the data type of the samples being considered; for example, color may be considered based on smaller decision regions than texture, as color may be effectively determined from less information. Additionally, the decision regions may have multiple sizes even for a single data type. Examples of some of these varieties are depicted in FIG. 5C.

The samples of each decision region are stored in the corresponding cells of the constructed array. For convenience, hereinafter each cell will be treated as equivalent to the decision region of the coordinate space that it represents, save where the distinction is noted to be relevant.

Each decision region is examined to extract one or more data vectors specific to the decision region, as briefly described for operation 133 of FIGS. 1A and 1B. A "data vector" may be any set of values which may be derived (extracted) from the samples of the decision region. Although a data vector may be a single value, such a data vector is likely to be insufficiently distinct for classification purposes, and therefore a plurality of values is preferable. For any classifier, the extraction process and the format of the resulting data vector should be consistent across both training and classification, so that vectors will be comparable. However, different extractions may be used for different classifiers. It is noted that the vectors may not have a one-to-one correspondence to the samples; a vector may be derived from a plurality of samples in the decision region, or a plurality of vectors may be derived from one sample.

The extracted vectors may be stored in the same array as the array storing the source samples, or in a different array.

In the depicted embodiment, each decision region such as 511 is further spatially divided into rows and columns (in the depicted example, 8×8), and data vectors 511' for said decision region are produced, each as a function of the samples within one of said rows or columns. For example, in accordance with a texture-based classification, the function may be a Fast Fourier Transform (FFT), followed by reducing the coefficients to the log magnitude of the real frequency components. In such an example, sixteen vectors, or values, are produced for each such texture decision region which tiles the example bounding box.

This is only one example, and in other embodiments, only rows or only columns might be considered, or the samples within the decision region might be processed into vectors in another manner entirely, in numerous ways that will be clear to those of skill in the art.

In some datasets, such as one containing samples of a color datatype, it is possible that the decision region will include only a single pixel, and therefore only a single data vector (of, e.g., the RGB values for that pixel, or some derivation thereof) will be produced for the decision region.

The samples themselves may be processed in some manner for organization or simplification prior to the conversion to data vectors. As an example, for a texture point cloud data type, the point cloud may be rastered within the bounding box at a target resolution. As another example, for a pixel data type, RGB values may be captured band by band, or in grayscale by first converting the color to grayscale. Additionally, values in any grouping of samples may be averaged to represent said grouping, effectively reducing the number of samples (i.e. the resolution of the region) for faster processing.

Where multiple datasets are being considered—for example, both image pixels and texture point clouds—a separate set of decision regions, and by extension a separate set of data vectors, will be formed for each dataset. The target resolutions between the two datasets, and therefore the size of the decision regions, may be different, and if so the results of their processing may be recombined in a manner to be described further herein. Preferably, data vectors from the different datasets and data types are extracted and classified independently, and combined only after individual classification.

Texture data in particular may be characterized in multiple ways, both at the time of sample capture and at the extraction of the data vectors, according to various embodiments. Some of these possible characterizations will now be elaborated upon.

As previously noted, in some embodiments, texture samples may be initially captured in the form of an elevation point cloud, or a raster thereof. Other possible representations include image-based samples (using RGB, multi-band, or grayscale), or a raster or spatially mapped field of values such as FIR or LIDAR intensity, or of a ratio of these and other values.

The vectors of each decision region may be measured from the initially captured samples by, in some embodiments, extracting linear sample data for each row and column of the region, for a total of 2n vectors in an n×n square pixel decision region. In other embodiments, only the rows or only the columns may be extracted. A pre-established concatenation of rows or of columns may also be formed into distinct vectors.

Preferably for textures, a Fourier transformation, such as a Fast Fourier Transform (FFT), is applied to each vector. The resulting Fourier coefficient set may collectively serve as the resulting texture "value" or measure for the vector. Alternatively, or in addition, a magnitude of the real frequency portion of the Fourier coefficient set, or the log of said magnitude, may be used.

If a target number of coefficients is desirable, each vector may be "zero-padded" to arrive at this target. Also, before the Fourier transformation, hamming or another window function may be applied to each vector in some embodiments.

Other exemplary methods of texture measurement and extraction include, but are not limited to: taking a 2D or 3D Fourier transform (rather than operating on row and column vectors), using alterative transforms such as wavelet or Gabor transforms, or decomposing using a sparse or simultaneously sparse analysis method via matching pursuit or convex optimization. In each of these cases, the resulting coefficients, rather than the raw data alone, are utilized as a feature data vector.

Measurements for both texture and other measurements may be classified in accordance with classification methods to be described further herein.

4. Classification and Demarcation

Data vectors, or other sample measurements or derivations thereof, may be used in a support vector machine (SVM) or other machine learning classifier, which are known in the art and will not be elaborated on herein. For convenience and brevity, an SVM performing a threshold discrimination will be assumed hereinafter, but it will be recognized that the principles disclosed herein may be applied to other numerical machine learning classifiers, which may substitute for the SVM.

As an example, in previously described embodiments which consider textures, and which employ a Fourier transformation to determine representative values of the texture in a decision region, a sequence of Fourier coefficients from each row and column may be mapped into the data dimensions of the SVM data vector. Alternatively, the sequence of Fourier coefficients from each row is concatenated to each column and mapped into the dimensions of the SVM data vector, thus establishing sensitivity to the spatial directionality of the texture. Each dimension of a data vector corresponds to one dimension of the classifier decision space.

Training vectors with known classifications may be used to train and support the SVM classifier, as briefly described for operation 140 of FIG. 1A. A dimensionally standardized list of vectors for a target feature category may be generated from sample for each classification to serve as predetermined target-identifying criteria. It is noted that high dimensional data vectors may be reduced in dimension through operations such as PCA, non-linear PCA, and/or sparse feature decomposition such as GAD and others.

Once a classifier is trained through data vectors derived from example spaces, and portions and samples thereof, a novel space or a portion thereof may be sampled in the same manner, and each decision region within may be classified based on SVM classification of vectors taken from that decision region, as briefly described for operation 151 of FIG. 1B.

It is noted that a trained classifier may also be saved and recalled for general reuse.

Classifiers may be combined to an arbitrary extent via a voting scheme, and thus any classifier may include a plurality of component classifiers. Generally, each component classifier will be designed granularly to operate in one modality for one data type (texture, color, etc.), at one resolution, for one decision region size. These component classifiers may be trained separately, as described above, and then combined as needed.

When a decision region produces multiple data vectors, each data vector is preferably used as an independent sample for the same classification process; that is, each vector is fed to the classifier independently, and classified independently of the others. For instance, returning to the example depicted in FIG. 5A, each row and column of decision region 511 is separately extracted to produce sixteen data vectors 511', which can then be classified independently to produce sixteen classification results. These sixteen results may then be resolved, or aggregated, into a final classification of the entire decision region 511, as briefly described for operation 153 of FIG. 1B.

The individual results are preferably aggregated by a "vote" of vector results over the decision region. A simple majority or plurality vote may be used in some embodiments. In other embodiments, a voting threshold value may be established wherein, if no classification meets said threshold, the decision region remains undecided.

Additionally, certain classifications may require a different threshold than others, or may be required to exceed all other classifications by a selected amount or proportion. Alternatively, certain classifications may be weighted more strongly, so that a vote for a particular classification may, for instance, count as double that of a vote for another particular classification.

In certain embodiments, rather than a single vote for each data vector, a classifier produces one or more scores, each representing the probability that the vector should be classified according to a particular classification. These scores may be treated as a set of votes in determining the classification of the decision region. It may also be possible to average the values of the actual data vectors to produce a single data vector for the entire decision region, which will be separately provided to the classifier to classify said decision region.

In still other embodiments, no single classification is provided. Instead, the proportion of votes (or scores) for each classification is presented for the decision region, in essence reporting the probability of said region being any particular classification. This style of report may be used in particular when the decision region remains undecided, but also generally in some embodiments.

As opposed to voting for one of multiple classifications, in some embodiments, a plurality of classifiers provide a plurality of binary classification choices made for each region. That is, each classifier is trained for a different, specific classification, determines whether it is more likely that the region meets or does not meet said classification, and makes a "yes" or "no" decision accordingly. If only one classifier produces a "yes" decision for a decision region, the decision region is determined to meet that classification. If multiple classifiers produce a "yes" decision, several approaches may be used to resolve the conflict, including but not limited to:

Classifications or classifiers are weighted, and the highest weighted "yes" is selected;

A probability for each possible classification is maintained where the region overlaps with other regions, to be reconsidered based on the results of the surrounding regions; or Each conflicted region is left "undecided," but vote information for each possible classification is maintained, so that thresholds and weights may be reapplied rapidly to re-render and adjust later.

Any of the voting and scoring methods described above may be expanded to groupings of decision regions, which may be therefore aggregated to represent a single classification of any size, as briefly described for operation 155 of FIG. 1B. The metric may also change between levels; as one example, a scoring vote may be used to determine the classification of a decision region based on the vectors within, while a minimum-threshold vote may be used to determine the classification of a region group based on the decision regions within.

While each modality of classifier may have its own decision region size, in one example embodiment, each is aggregated to determine a classification over a final decision that is typically the same size as that of the largest component classifier. Thus, in one example, if component classifiers include a color-based decision by 0.1 meter RGB pixels, a far infra-red (FIR) texture-based decision at 0.25 meter pixels grouped into 8×8 blocks to form 2 meter decision regions, and a terrain elevation point cloud texture-based decision raster sampled at 0.25 meters grouped into 16×16 pixel blocks to form a 4 meter decision regions, then these three layers of component classifier would be aggregated into the 4 meter spatial decision regions by summing (or otherwise aggregating) the votes from each component decision region that overlaps with the target aggregate decision region.

Figure 5B:
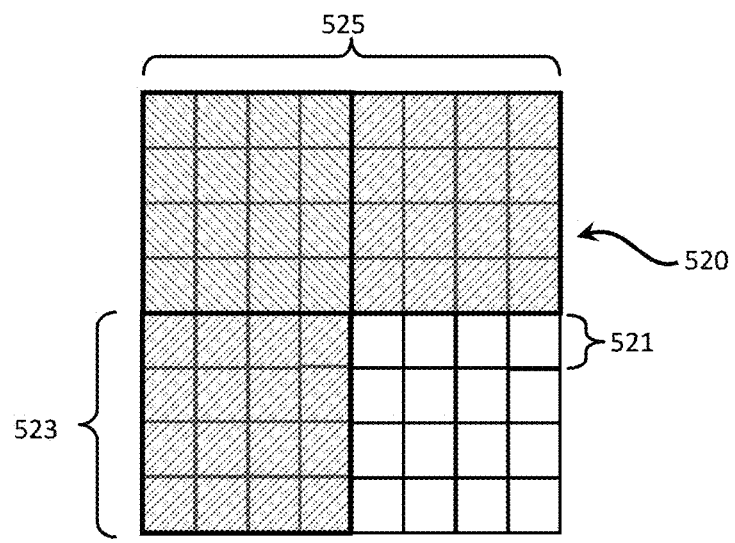
FIGS. 5B and 5C illustrate example overlapping decision regions of differing arrangements, in accordance with an exemplary embodiment of the present invention.
Figure 5C:
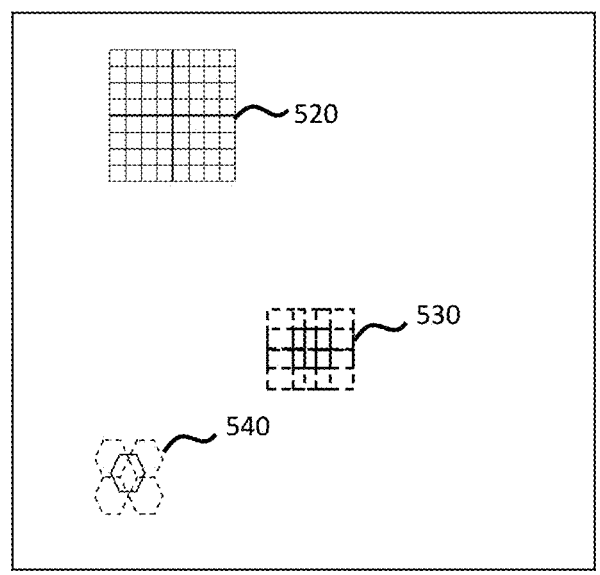

FIG. 5B depicts an example overlap between three scales of component classifier decision regions: single-pixel regions 521 (for classifying by, for example, color), 4×4 pixel regions 523, and an 8×8 pixel region 525. Spatially overlapping results may then be aggregated to the largest decision region size (in this example, the 8×8 region 525), resulting in an aggregate region 520. If the aggregation method is unweighted voting, for instance, the majority vote of the four 4×4 pixel regions 523, according to their individual classifications, will determine the classification of the aggregation for said regions according to the corresponding component classifier, and likewise for the sixty-four single-pixel regions 521 and their corresponding component classifier. The three component classifiers may then further aggregate for a combined decision of the largest region, again by unweighted voting or other methods, to determine the overall classification of aggregate region 520. It is again noted that any of the other voting or aggregation methods described above may be used for the classification of aggregate region 520 and other aggregation regions.

As previously noted, FIG. 5C depicts other example arrangements of overlapping decision regions in a fashion consistent with the original training data for the classifier, including aggregation region 530 which contains overlapping decision regions, and an aggregation region 540 which contains irregularly shaped decision regions.

With overlapping decision regions of different classifiers, the votes may, in certain embodiments, be weighted by type of data, data source, mode of analysis, or some combination. In particular, one data type, resolution, or source may be deemed more accurate for a particular classification and therefore weighted more strongly.

Assembling aggregate decisions by vote, at either the decision region level or at higher levels, enables a rapid adjustment and re-rendering of results. However, non-voting aggregation methods are also known in the art and may be employed instead.

The ability to aggregate the results of overlapping decision regions in this manner allows samples and cells from datasets of different resolutions—such as texture, which by its nature spans a physical space, and elevation or color values, which have pointwise meaning—may be freely combined, while nonetheless removing the need to consider the data of all sets jointly, thereby providing for fast, efficient computations. Moreover, any arbitrary number or type of classifiers for datasets differing in any aspect, whether resolution, data type, or modality, may be integrated post-classification based on mapping to a common decision region scale, rather than training a new classifier for each combination of datasets.

Once classified, adjacent or overlapping decision regions of a common classification may also be grouped into a constructed cluster of regions (that is, cells), and rendered as vector polygons for overlay on a visual display.

The original bounding boxes may be used as a cluster, if sufficiently refined as described earlier herein. A voting process for all decision regions within the bounding box may be used to define the classification of the entire feature. Other previously established boundaries, such as roads in a terrain space, may also be used for part or all of the polygon boundary.

As previously noted, however, a refined bounding box, or indeed any bounding box, may not be available. Additionally, in many embodiments, it is preferable not to assume that the classified feature fills the entire region within the bounding box. In particular, in some embodiments, if the voting process does not clear a high threshold in determining the classification of the regions within the bounding box (e.g. if less than 95% of the regions are determined to be of a target classification), the bounding box may be rejected as a cluster of common classification.

Figure 6:
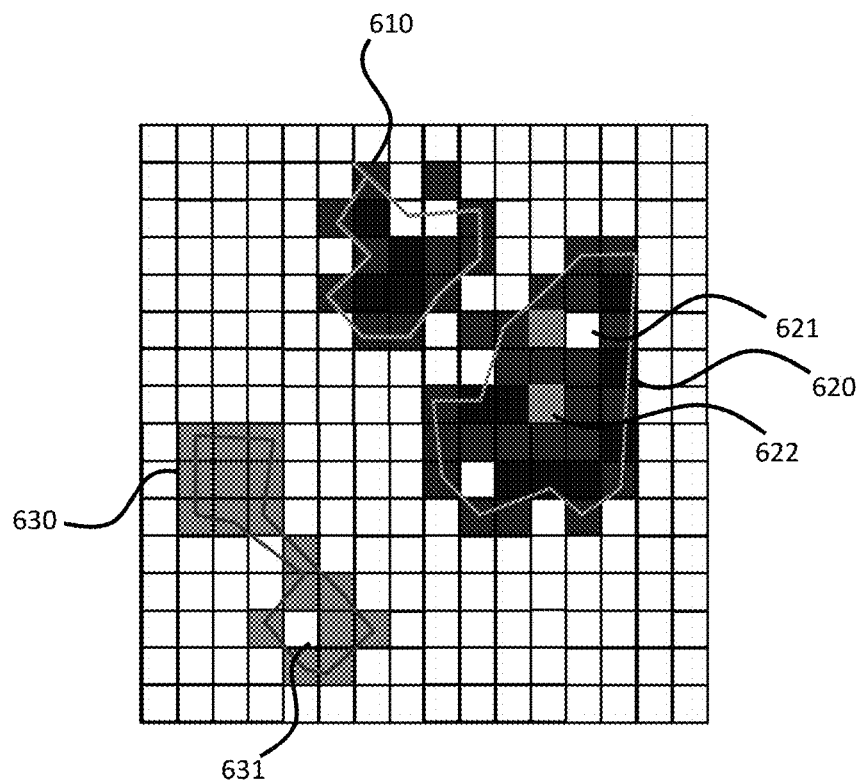
FIG. 6 illustrates example aggregations of decision regions and corresponding boundaries of a classified feature, in accordance with an exemplary embodiment of the present invention.

FIG. 6 illustrates an example rendered form for the boundaries of a classified feature determined from the classification process. Here, a raster output of the classification process has been based on tiled decision regions to generate a vector polygon model of coherent extents of similar classification. As depicted, polygonal boundary outlines 610 and 620 represent features of a first classification, and polygonal boundary outline 630 represents features of a second classification.

To generate these outlines, the classification results are rendered according to the spatially mapped arrangement of the decision regions or cells, to form a mask raster at the resolution of the decision region spacing. Single regions of mismatching classification within a potential cluster, such as decision regions 621, 622, and 631, may be suppressed through use of a median filter or similar. The median filter may also suppress small and singleton points so as to reduce the number of nuisance polygons, which would otherwise exist at, for instance, decision region 611.

Simple connected groups of decision regions within the smoothed data which are commonly-classified for each classification, peripherally bounded in the spatially mapped arrangement by regions of different classification, are each arranged into a constructed cluster. These clusters are outlined at decision region resolution. As depicted in the example of FIG. 6, the centers of each "border" decision region are treated as operational points for defining the classification boundary, although the outer edges or other points in the decision regions, or in surrounding decision regions that have not been classified to be part of the feature, may also be used. The result is a sensible, understandable clustering of classes with a reasonable and actionable number and density of individual polygons rendered for the user. However, other methods for establishing such clusters and outlines, based on the individual decision region classifications, are known in the art and may be employed instead.

It is again noted that the above cluster generation may be employed even when a refined bounding box is also available, and the cluster and bounding box may each be used to verify the accuracy of the other in defining the boundaries of a target feature. Additionally, in some embodiments, an averaging of the two may be used as a final boundary of the feature. In other embodiments, one or the other may be considered more accurate by default.

Although not depicted in FIG. 6, a graphical interface may project the polygon outline vertices, or boundary, into the high resolution of the original data space, using the spatial coordinates associated with the decision regions. The decision projection is thereby mapped back to the physical space or features and overlaid on an image representation or other visual display of the physical scene, generating a composite image which demarcates and highlights the classified feature. Examples of such an overlay will be provided further herein. It is noted that the use of vectors improves over presentation of raw raster coding of decision regions by reducing the representation to a vector model of coherent larger areas, and is therefore preferred.

If the visual display of the physical scene shares the coordinate space used in the original mapping of the samples, or uses another coordinate space defined relative thereto (e.g. a high resolution two-dimensional space for the visual display, defined relative to a low resolution three-dimension space for the samples), then the boundaries of the overlay will accurately fit to the location of the feature in the visual display.

Certain exemplary applications will now be described in more detail.

5. Exemplary Application: Three-Dimensional Feature Classification

An exemplary application will now be described, in which earth works, mounds, stockpiles, discontinuities and other three-dimensional features of interest are identified and demarcated within a geospatial terrain dataset.

In this and other applications, data may be determined even during the establishment of the bounding box. As one expansion of the bounding box process in the context of geospatial terrain data, referring back to FIG. 4, during the initial bounding box setting 410, a sliding window (or convolution) matched filter may be applied to the dataset to detect and measure the degree of convex or concave features of a particular scale or range of scales present at a plurality of geospatial points. The matched filter may be shaped to suit expected targets of interest, in scale, aspect rations, orientation, or other characteristics. A Gaussian or similar raised spatial function may be used as a convex (or concave) matched feature model.

Substantially connected areas in which this measure is above a threshold may be demarked, and those substantially connected areas may be retained within a certain spatial size range as candidate targets of interest. The area size may be used to estimate the size of the target, or of a central portion thereof.

With these areas each set as an initial bounding box, the process of FIG. 4 may continue through operations 420 through 450 for each said box. These identified targets may be employed to assist in classifying said targets according to material, surface type, texture, or other aspects, or in providing said targets as samples for classification training, as disclosed above. However, other uses for an automatically- and accurately-defined target of interest may also be imagined by those of skill in the art.

Returning to FIGS. 3A and 3B for this example application, FIG. 3A illustrates the result of an example process applied to finding stockpile mounds in a region of a quarry. The light gray frames, such as boxes 310, show the center portions of the identified mounds, which may have been determined automatically as described above, with the orthophotographic image displayed behind them for reference. FIG. 3B shows these same mounds refined to contour outlines, such as outlines 320, demarking their boundaries, with the addition of text to the upper left of each showing the volume and material composition of the mound (determined through both the methods disclosed herein and other methods). This data is overlaid on elevation point cloud data rendered in shaded relief to show its 3D structure.

Figure 3A:
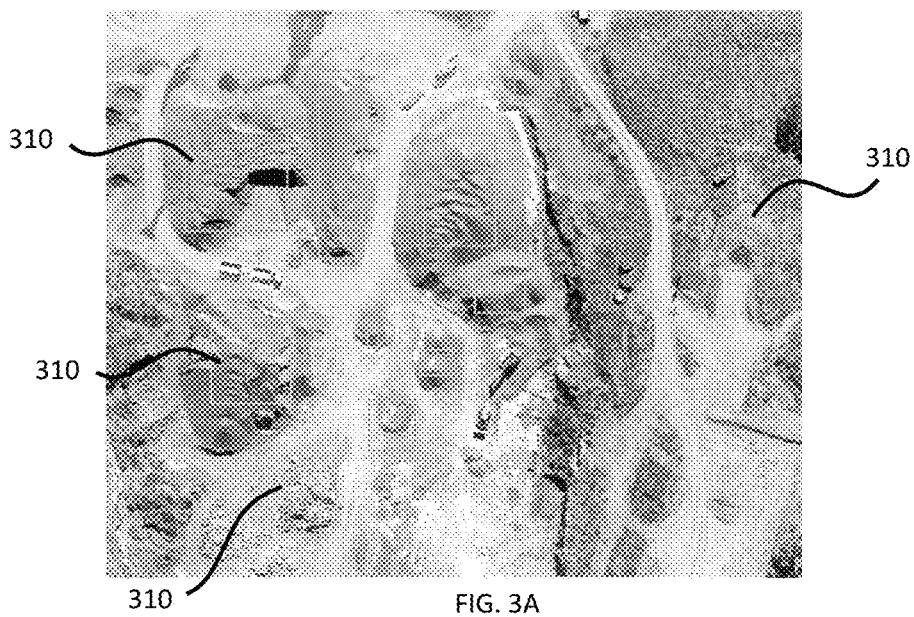
FIGS. 3A and 3B are example user interface images which illustrate initial bounding box selections and classification overlays, respectively, in accordance with an exemplary embodiment of the present invention.
Figure 3B:
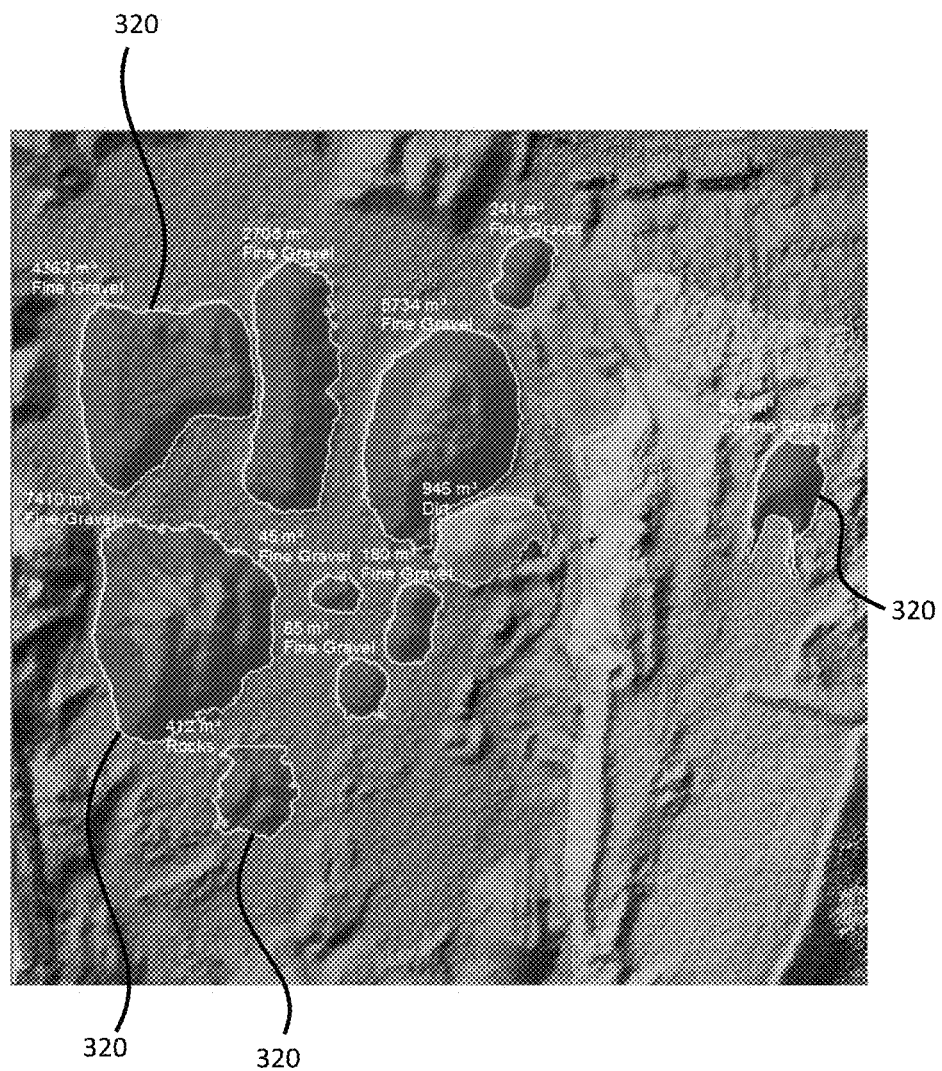
Figure 7:
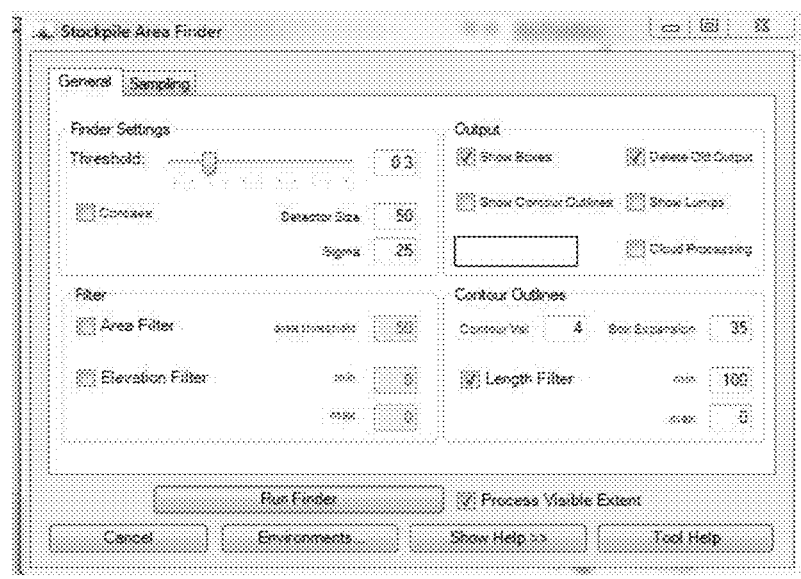
FIG. 7 is an example user interface form for adjusting bounding box refinement parameters, in accordance with an exemplary embodiment of the present invention.

The process of producing FIG. 3A requires us to find mounds automatically within the data set. In this instance operational parameters can be adjusted via a user interface form, an example of which is depicted in FIG. 7. The information is used as in this example embodiment as follows (mound finding):

1. The 3D point cloud is reduced to a raster digital elevation model, on the fly, at a target resolution. This resolution is typically 0.25 to 0.5 square meters, but any value may be used affecting only the accuracy of the resulting outlines.

2. A prototype mound function is created, in this case using a Gaussian of sigma=25 points built in a detector size grid of 50×50 points. This is applied to the raster elevation model as a convolution filter—in essence a point multiplication of the underlying data with this Gaussian function moved from point to point in a sliding window. The output value at each point is the sum of that point multiplication over that window span, normalized by the total amplitude energy in the raster at within that frame.

3. Any value of the threshold of 0.3 (or other value set by the user) is considered true while less is considered false. The net effect of this is to create a map of "lumpy" spots over the X-Y extent of the raster model.

4. An area filter is applied to keep only larger connected groups of such true values.

5. The resulting connected groups are bounded by a rectangular frame box, representing the peaks of each discovered mound in a manner consistent with FIG. 3A.

The word "mound" is used generically to refer to any convex relief or concave depression in the surface shape. It is not intended to be limiting. Thus a ditch is herein a "mound" with negative relief.

Figure 8A:
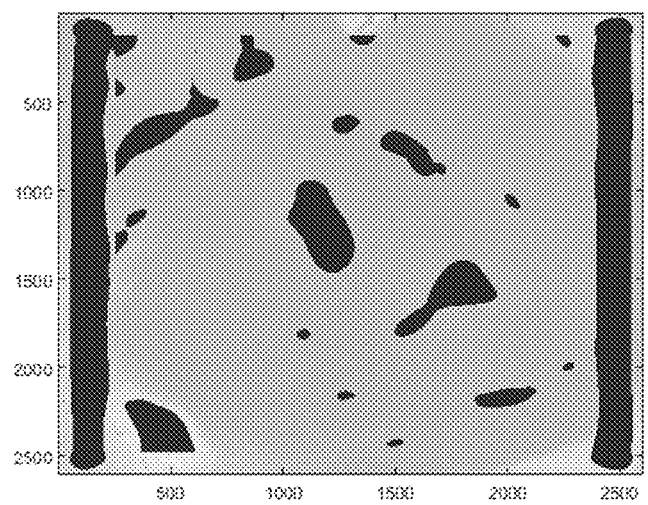
FIGS. 8A and 8B are example user interface images which illustrate two results of a mapping function, in accordance with an exemplary embodiment of the present invention.
Figure 8B:
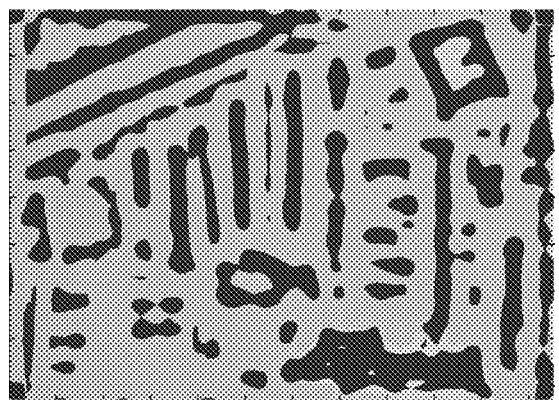

FIGS. 8A and 8B show example threshold responses resulting from the true-false mapping function described above, where the black regions exceed the threshold. FIG. 8A shows the results of the function on a series of mounds in a quarry, while FIG. 8B shows the results on a collection of wood piles and buildings. In all cases, it becomes apparent when the information is shown this way that the connected regions may be filtered by size, shape, orientation, etc. Therefore, well-known methods in image processing can be employed to draw a bounding box frame around each individual connected region, substituting for the refinement process depicted in FIG. 4 entirely, for both classification and other processes.

Other filters may be applied, such as the range of elevations, or whether the deflection is negative or positive (convex or concave). The ratio between the sigma and the resolution of the model sets the proclivity for detection of lumps of certain sizes and vertical dynamics. A shape other than a Gaussian may be used for tuned detection, in the manner of a matched filter.

Figure 9A:
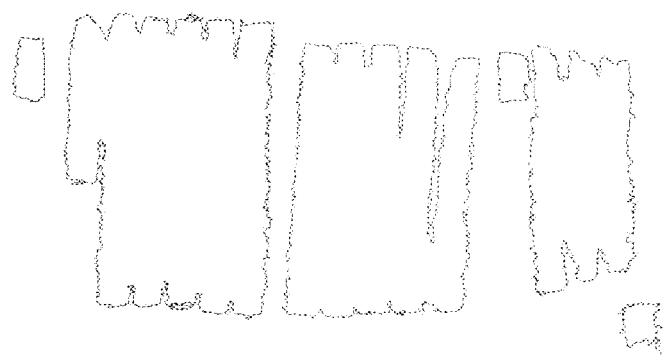
FIGS. 9A and 9B are example user interface images which illustrate an overlay outline by itself and as overlaid on an image, respectively, in accordance with an exemplary embodiment of the present invention.
Figure 9B:
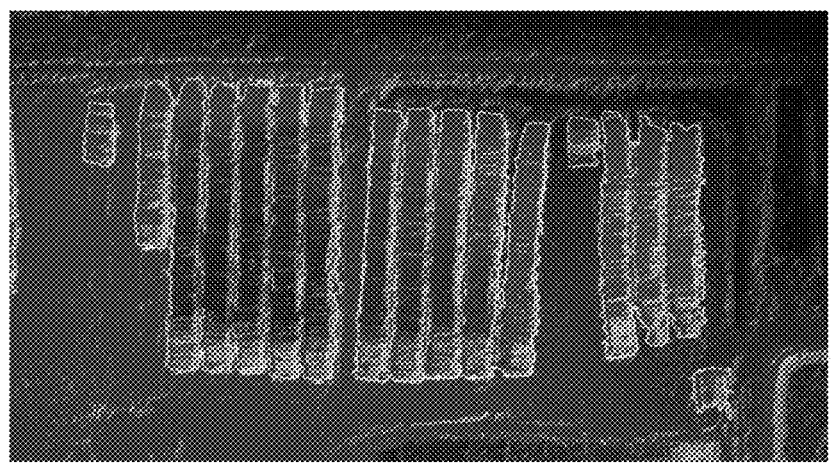

The prototype mound function may be varied to look for skew and directional rotations of structures with more linear extent (such as long berms, ditches, wood piles, etc.) rather than mounds. FIGS. 9A and 9B illustrate an example result of stockpile discrimination and demarcation on a collection of wood piles; specifically, FIG. 9A depicts the polygonal boundaries by themselves, and FIG. 9B depicts them as overlaid upon an image of the terrain region.

It is noted that the interior of the bounding frames are largely interior to the mound itself, except in the event of convexities. Thus other quick operations can be performed to further filter the discovered mounds. An advanced option is to perform classification operations on the interior of the frame, as enabled later in this specification, to find the surface type or material contents—or to rule out certain confounding earth mounds that are, for example, not stock piles. Thus areas consistent with dirt or gravel might be kept, while those consistent with grass, vegetation, or natural ground areas would be discarded.

In order to automatically outline the discovered mounds, each frame can be further processed through contour outlining in the manner depicted in FIG. 4, or through similar methods.

In some embodiments and configurations, filters may be applied, such as on the perimeter or size of the bounding polygons so that only mounds of a target range are retained. Some possible filters may be seen in the example user interface form of FIG. 7.

In some embodiments and configurations, the contour may be determined by intersection with a plane defined by lowest ground points in the expanding bounded box, thus permitting an estimate of the mound boundary on non-level ground.

In some embodiments and configurations, the contour may be determined by following breaks of constant slope, thus enabling both out lining on non-level ground and separation between neighboring mounds that run together. This slope can be considered as a scalar value at each point, by examining the magnitude of the numerical gradient of the raster data.

Once the outline of the stockpile, berm, or other mound or depression is reduced to a polygon, this enables further operations. For example, it becomes numerically simple to compute the volume of the interior of the polygon above its plane—and thus estimate the volume of the stockpile. This use case is of high value in the example quarry application.

The polygon thus defined may be used as the input for other processes, including classification of the demarked region in accordance with other operations disclosed herein, to predict the material contents, texture, packing, or other aspect of the discovered feature. For example, in FIG. 3B, the operations of finding the polygon are followed by classification as to material.

While mounds may be demarked by hand, in a user interactive fashion, and processed similarly, automation has the benefits of reducing time and of generating reports with minimal human interaction.

One example of a fully automated workflow is as follows:

1. Find frames for candidate stockpiles in accordance with the mound finding process above.

2. Screen the frames interior via filter and/or rapid classification to remove those that are unlikely to be stockpiles of the type of interest.

3. Find an outline polygon for each retained candidate mound in accordance with the outline contour process above.

4. Compute the volume of the material within and above the polygon outline.

5. Classify the surface within the polygon outline to determine the stockpile material.

This workflow may produce, for example, the output shown in FIG. 3B.

6. Exemplary Application: Two-Dimensional Terrain Feature Classification

Another exemplary application in a spatial terrain analysis setting will now be described, in which terrain is demarcated into sections of dirt, grass, and other surfaces. In this application, the terrain features are effectively two-dimensional and therefore may be treated as surface features.

Figure 10A:
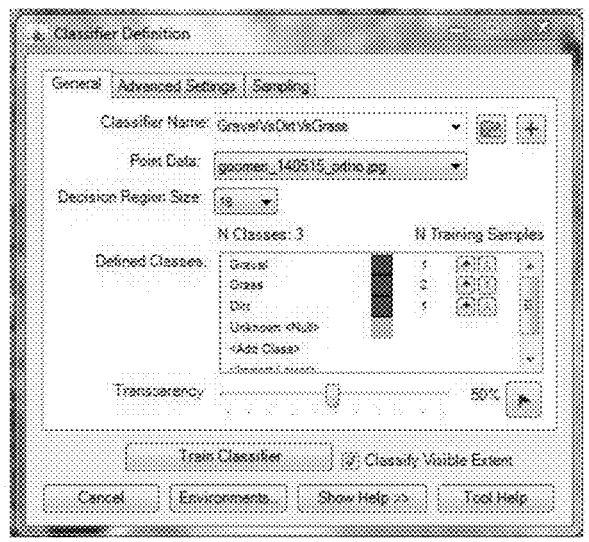
FIG. 10A is an example user interface form for defining classifier training parameters, in accordance with an exemplary embodiment of the present invention.
Figure 10B:
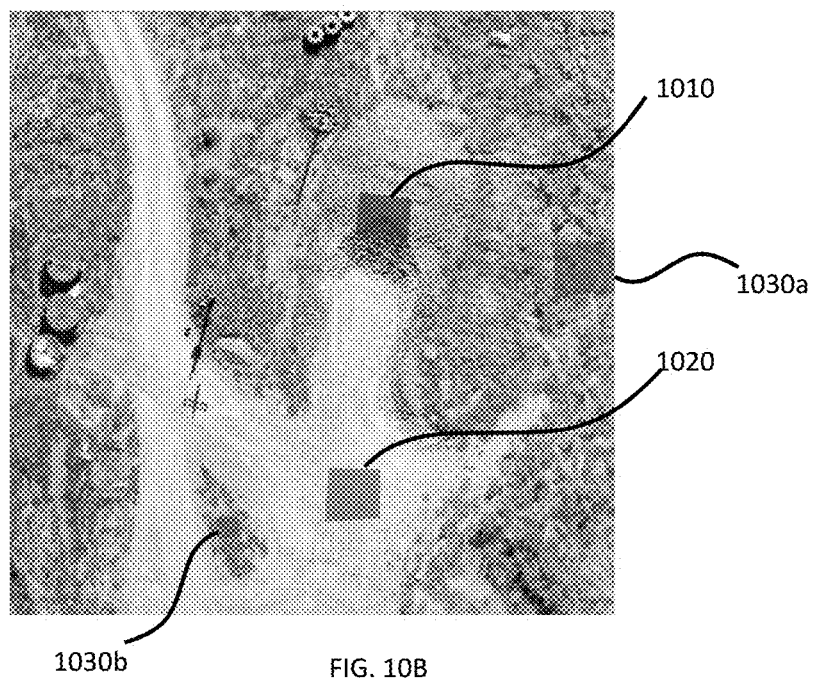
FIG. 10B is an example user interface image which illustrates the placement of training examples, in accordance with an exemplary embodiment of the present invention.

For this example, FIG. 10A depicts an example classifier definition user interface form, which instantiates user interaction in accordance with the invention, with corresponding user-defined class training example polygons depicted in FIG. 10B.

The user interface form of FIG. 10A enables the user to define, train and save a classifier enabling a convenient interaction methodology for using the subject methods in a practical setting. The user can define a decision region size over which to partition decisions in accordance with the methods herein. The user can also add new classes to the defined class list. Here, the user has added Gravel, Dirt, and Grass. For each named class they can add as many examples as they choose from the geospatial work space. This is done in this embodiment by clicking a first button in the row corresponding to the class. The user may also delete examples, edit examples, or change the color of examples.

By clicking on the Add Example button, a user may demark spatial areas, using a pen type tool in which the user can click on the mapping space and indicate vertices of polygons, or through other methods known in the art of user interfaces. Referring to FIG. 10B, in this example case, the user has added one polygon 1010 in blue demarking an example of Gravel, one polygon 1020 in brown demarking an example of Dirt, and two polygons 1030a, 1030b in green demarking examples of Grass. These selections are reflected in the example form in FIG. 10A, with respect both to color and to the number of training samples for the respective named classes. It is noted that any number of training samples and classes can potentially be included in a definition, which have been limited to four in this example for simplicity.

Once training examples are selected, the Train Classifier button is used to capture data from the training polygons and initiate the building of the classifier.

On the advanced tab (not illustrated here) the user may select aspects of the geospatial datasets on which to operate. In this instance, an RGB color orthophoto and an elevation point cloud are both available. For either or both of these, individual values (elevation, color, or gray scale) or texture (on elevation, on grayscale, or on individual color bands) may be considered. Other geospatial datasets (that is, overlaid data layers) may also be available and can also be considered. The sampling tab (not illustrated here) allows the user to adjust the sampling methodology and raster density for this sampling data from each data source; it is of more relevance, however, for point cloud data than for data sources that are already raster by nature.

Thus, as an example, for texture on point cloud, the system will set a bounding box around each example polygon, raster the point cloud within those bounding boxes at a target resolution, and tile the bounding box with texture decision regions so as to span the polygon within the bounding box raster.

It is noted that in this specific embodiment and use case, a Classify Visible Extent box is checked—so that when the classifier is done training, it will immediately execute to classify all elements in the visible extent of the map. If this box were not checked, the system would generate and store the classifier, but not execute it to classify any new data until later recalled by a user.

Figure 10C:
FIGS. 10C and 10D are example user interface images which illustrate two complete classification overlays upon the same image, in accordance with an exemplary embodiment of the present invention.
Figure 10D:

FIGS. 10C and 10D depict example classification outputs from the Classify Visible Extent example set up in FIGS. 10A and B. FIG. 10C shows the three classes rendered with a 50% vote decision threshold, and FIG. 10D with a 40% threshold. It can be seen that, in this example, the 40% threshold produces the more accurate result.

Figure 10E:
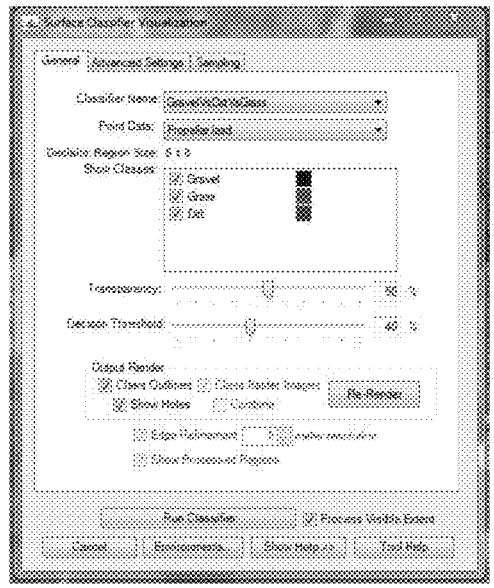
FIGS. 10E and 10F are example user interface forms for defining overlay presentation and classification parameters, respectively, in accordance with an exemplary embodiment of the present invention.
Figure 10F:
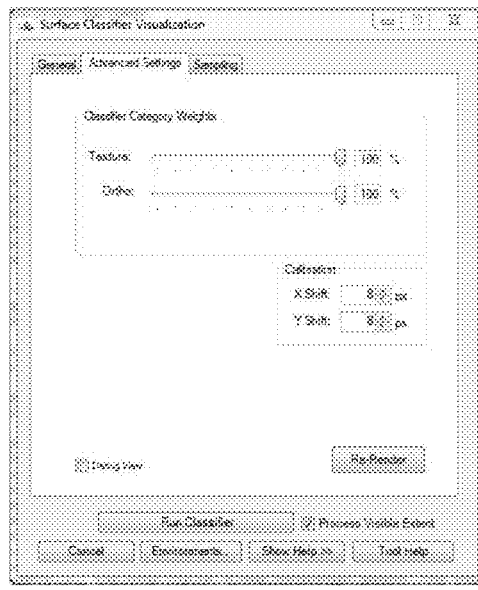

FIGS. 10E and 10F illustrate example user interface forms for conveniently adjusting visualization renderings of classifier outputs. The form in FIG. 10E includes controls to change the color and transparency of rendered classes, and to select from a number of raster and vector polygon output formats. An important control is the Decision Threshold, used to adjust what proportion of a decision region votes must agree in order to declare that each small segment of terrain is a particular class. Changing this control results in a reweighing of decisions and a more or less generous tendency to decide in favor of class membership, as depicted in FIGS. 10C and 10D. The form in FIG. 10F includes sliders by which to adjust the weighting of texture vs. orthographic RGB image color space. Other similar forms, in certain embodiments, allow the reweighing of votes for each individual class to better balance responses.

Figure 11:
FIG. 11 is an example user interface image which illustrates a complete classification overlay upon an image of a terrain site, in accordance with an exemplary embodiment of the present invention.

FIG. 11 shows an example of a larger site survey, where trees and natural grassy ground areas are automatically demarked with a color overlay. Combined with terrain-demarcation overlays such as FIG. 3B, this produces an extensive automatic site survey capability.

7. Exemplary Application: Vegetation Condition Classification

Another exemplary application will now be described, in which crops are inspected to identify and demarcate damaged portions thereof.

Figure 12:
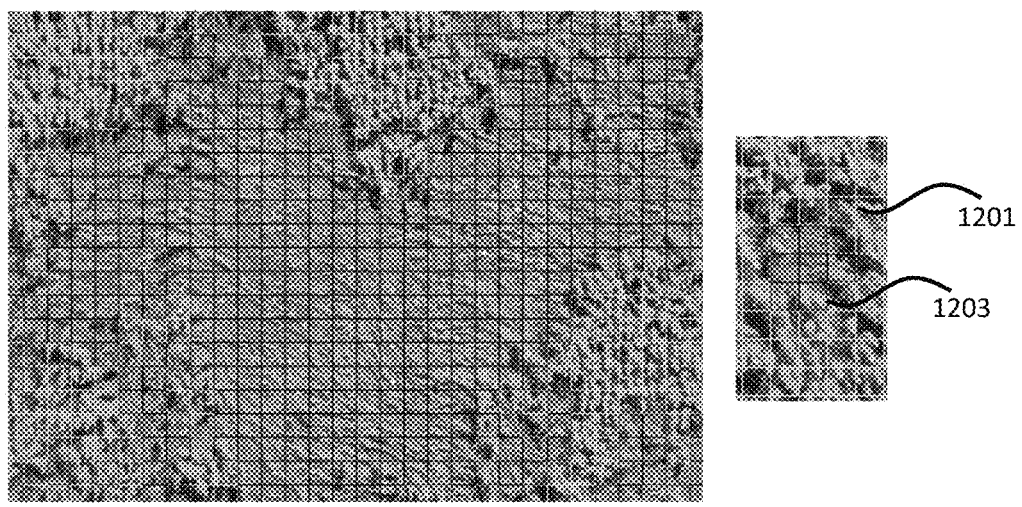
FIG. 12 is an example user interface image which illustrates a grid-based complete classification overlay upon an image of an agricultural site, in accordance with an exemplary embodiment of the present invention.

For this example, FIG. 12 illustrates an area of crops which were partially damaged by severe windstorms. This is one part of an infrared (IR) orthophoto image aggregated from photos taken by a drone flown over the field. Areas or downed and standing crops are apparent. The photos are gridded 1 meter square decision regions.

Within each decision region is a grid of 32×32 image pixels. By taking a Fourier transform of this region, a measure of texture may be computed. One embodiment employs a 2D Fourier transform, but this is directional and does not reduce the dimensionality of the data. A second embodiment operates on each row and/or column of the 32×32 image and takes a linear Fourier transform of each. A third embodiment concatenates, for example, the rows into a 1024 point vector and takes a single linear transform. A fourth embodiment averages the transform over rows or columns to create a smaller data set. It is noted that non-Fourier transformations, or transformations in addition to the Fourier transform (e.g. wavelet, GAD, etc.), may also be used in still other embodiments; however, the Fourier transform is used here by itself for speed and simplicity of operation.

For convenience of explanation, the following paragraphs will focus on the fourth embodiment. (Other example embodiments will be detailed later.) Consider taking the average Fourier transform over the rows of each decision region. The data is demeaned, and then an FFT obtains the transform. The data may be reduced to a real scalar at each point by taking the magnitude of the raw coefficients, as is well understood in the art. Additionally, the log of this magnitude may produce a log power spectra estimate, resulting in a 32 point vector representing the mean texture of this decision region in terms of its distribution in frequency space.

A collection of such 32 point vector can be obtained by selecting a subset of those decision regions in the grid of FIG. 12 that contain only standing crops. A second collection can be obtained by selecting a subset of those decision regions in the grid of FIG. 12 that contain only fallen crops. Thus, two classes of interest are established in this example. Vectors from each class can be used to train, in this example, a two class support vector machine (SVM) model, as understood in the machine learning art. In this case, a linear kernel separation space might be selected, but in other embodiments radial basis functions might be more appropriate.

The remainder of the decision regions are now classified based on the texture vector obtained using the trained SVM model. Looking close at the grid overlaid on images in FIG. 12, one sees that the grid is lighter in some regions, such as region 1201, and darker in others, such as region 1203. This represents the output of the classification operation—each lighter grid frame demarks a decision region containing mostly standing crops while each darker grid frame demarks an area containing mostly fallen crops as predicted by the classifier. The grid thus may serve as a visual overlay. Close observation will show complete correspondence with the actual state of the crops as judged by the eye.

Figure 13A:
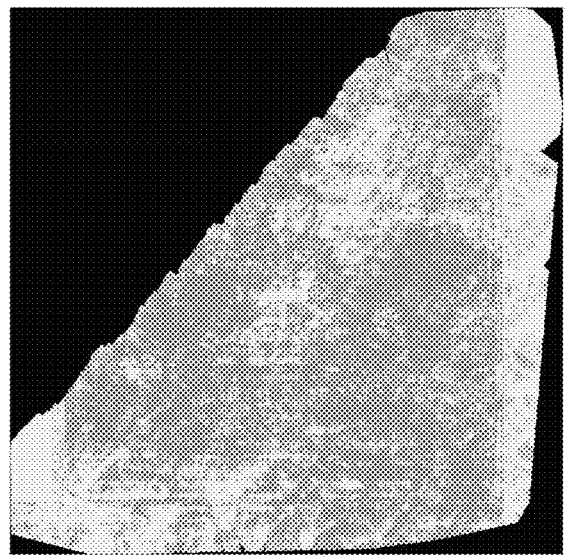
FIGS. 13A and 13B are representations of example classifications of the decision regions in an agricultural site.

FIG. 13A illustrates an example of how these classified texture regions may be distributed over an entire crop field. Each lighter gray area demarks downed or clear regions of the crops, while areas of lighter color demark the standing crops. Each pixel represents one decision region within the overall field. This gives a good idea of the overall distribution and proportion of the downed crops. However, because of the finely interspersed regions of texture types, another level of analysis can give clearer information.

Figure 13B:
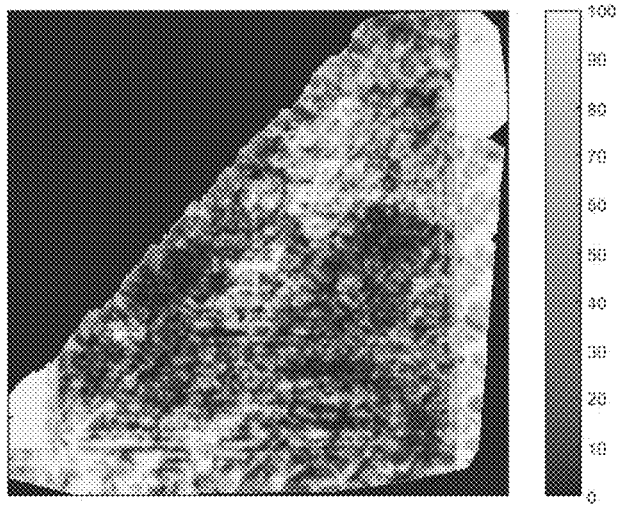

In another example for the same field, FIG. 13B shows a "heat" map representation, illustrating the percentage of crops down in any given area, coded from 0 to 100%. This map is generated by taking an n×n group of decision regions and computing the percent of those decision regions with downed crop texture. So, while it is at slightly lower resolution than the original texture classification analysis, it is an effective measure for practical use in assessment of the easiest travel paths or of the best cover areas throughout the field.

Vector polygons of regions can be generated by finding the boundaries of connected decision regions of the same class in FIG. 13A, using methods disclosed previously herein. A more practical useful means of generating a polygon outline in this case is to operate on raster heat map of FIG. 13B.

Figure 13C:
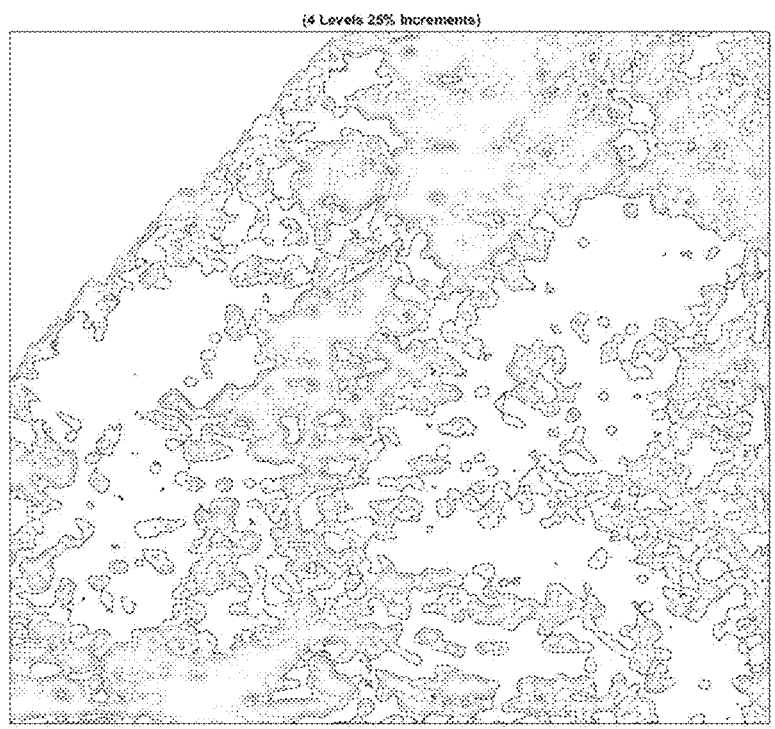
FIG. 13C illustrates a resulting complete classification overlay, in accordance with an exemplary embodiment of the present invention.

In this case, contours lines of constant value are generated, just as one might generate level set contours in the art of terrain cartography, but applied to the scalar value that represents the local percent of downed crops. Thus, in another example depicted in FIG. 13C, contours such as described demark the levels of damage. Each major change in contour gray level demarks an increase of 25% in downed crops. Undamaged areas are clear white. A vector polygon may be used conveniently in many GIS systems for demarking areas of interest or informational displays on maps.

8. Exemplary Application: Structure Surface Condition Classification

Yet another exemplary application will now be described, in which a steel tower is inspected to discriminate and demarcate sections of rust on its surface.

Figure 14A:
FIG. 14A is an image of an example structure.

For this example, FIG. 14A illustrates a visual display of a steel tower. Inspecting it for rust is a challenging visual task, particularly from a collection of irregularly collected drone photos. Ordinary color matching, as found in a photo or paint type program, is insufficient for this task, because rust comes in a variety of colors that do not form a connected group in color space.

This detection case is enabled as follows, using methods disclosed above:

1. Select examples of rust collected by hands from a few sample images.
2. Use RGB color values collected from these example pixels as training vectors to build a classifier.
3. Train a one-sided SVM classifier using radial basis functions to measure similarity to the example cloud of rust colors.
4. Apply this classifier to pixels in each image to rank color similarity to rust targets.

Figure 14B:
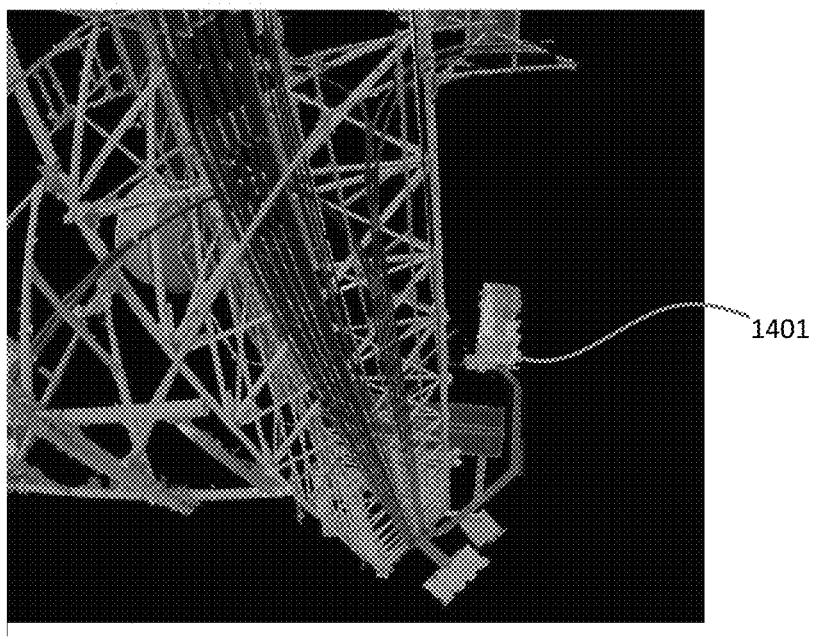
FIG. 14B is a composite version of that image with a classification overlay, in accordance with an exemplary embodiment of the present invention.

FIG. 14B shows the automatic detection and depiction of the rusty areas of the structure shown as pink on a green background. The pink areas, such as area 1401, represent those pixels with the greatest similarity to rust according to the above process.

This operation may be accelerated by using the above method on a down-sampled photo, then returning to full resolution by up-sampling the ranking results to the original resolution. A neighborhood around each area in which rust is found is searched and classified for other rust pixels at the higher resolution.

A preferred embodiment will also color balance the photos for a constant reference, such as the tower scaffolding color, thus rendering the rust into a more standardized color space. A further improved embodiment will incorporate not only this color value matching method, but also a decision region texture measure as illustrated in previous examples, thus finding rust by a combination of similarity in both color space and local texture.

It is again noted that, while the examples show end-to-end training and classification, classifiers can be stored and reused without new training. Thus, standard libraries of classifiers are enabled, which can be used on any set of data to find standard textures, materials, ground patters, vegetation, and so forth. Likewise, for inspection cases, rust, damage, or other visual or textural patterns can be rendered into standard detectors and classifiers for general use.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method steps may be substituted for those specifically shown and described, and certain features may be used independently of other features, and all or some of the above embodiments may be selectively combined with each other, and in certain cases, particular locations of elements or sequence of method steps may be reversed or interposed, all without departing from the spirit or scope of the disclosed system and method as defined in the appended claims. The scope should therefore be determined with reference to the description above and the appended claims, along with their full range of equivalents.

What is claimed is:

1. A system for detecting and discriminating a feature of interest merged with other features within a physically transduced scene, the system comprising:
    an array generating portion executing on a processor to define a multi-dimensional spatial array containing a plurality of physically transduced samples captured for the scene; and a target discriminating portion executing on a processor to:

formulate a plurality of classification levels, wherein the plurality of physically transduced samples of the scene are mapped at each of the classification levels into a plurality of unit cells of said classification level, the unit cells of different classification levels encompassing spatial regions of different size within the multi-dimensional spatial array, apply a plurality of predefined classification schemes at the respective classification levels to generate level-specific classifications for the unit cells thereof, the predefined classification schemes of at least two classification levels being different and mutually independent in execution upon different samples captured from the same portion of the scene, combine the level-specific classifications for the unit cells across the plurality of classification levels to adaptively construct at least one cluster of spatially-contiguous cluster cells based thereon, the cluster cells each being of a common preselected spatial region size independent of classification level, the at least one cluster at least partially defining the feature of interest in peripheral contour within the scene, and, trigger a detection signal corresponding to discrimination of the feature of interest within the scene, wherein the combining of level-specific classifications includes, for each cluster cell within the at least one cluster:

combining the level-specific classifications for the unit cells of each respective classification level contained within the cluster cell to generate a level-specific classification of the cluster cell, and, combining each level-specific classification of the cluster cell to generate a general classification of the cluster cell.

2. The system of claim 1, wherein each of the plurality of predefined classification schemes includes executing a pre-trained support vector machine to perform threshold discrimination upon samples mapped into a unit cell to be classified.

3. The system of claim 1, wherein the plurality of classification levels include a base classification level mapping samples one-to-one to the unit cells of said base classification level, and at least one high classification level mapping spatially-contiguous groups of samples one-to-one to the unit cells of said at least one high classification level.

4. The system of claim 1, wherein at least one classification level of the plurality of classification levels maps a spatially-contiguous group of samples to each of the unit cells of said at least one classification level, and a predefined classification scheme applied to said at least one classification level includes:

constructing data vectors of each of a plurality of spatially-linear set of samples, performing a Fast Fourier Transform (FFT) upon each data vector, reducing coefficients resulting from each FFT to a log magnitude of real frequency components, and comparing a resulting set of log magnitudes to log magnitude sets resulting from identified training samples.

5. The system of claim 1, wherein the preselected spatial region size of the cluster cells is equal to a spatial region size of a largest unit cell of all classification levels.

6. The system of claim 1, wherein the target discriminating portion combines the level-specific classifications for a cluster cell by:

for each classification level, standardizing a collective classification score of all unit cells which spatially overlap the cluster cell, and aggregating the collective classification scores of the classification levels to determine a cluster cell classification score.

7. The system of claim 1, wherein the triggered detection signal includes a generated composite image demarcating peripheral contours of the at least one constructed cluster against a visual display of the scene, the generated composite image displayed in a user interface.

\* \* \* \* \*